United States Patent
Taylor et al.

(10) Patent No.: US 9,367,866 B2
(45) Date of Patent: Jun. 14, 2016

(54) METHOD AND SYSTEM TO AUTOMATICALLY QUALIFY A PARTY TO PARTICIPATE WITHIN A NETWORK-BASED COMMERCE TRANSACTION

(71) Applicant: eBay Inc., San Jose, CA (US)

(72) Inventors: Jeffrey Taylor, Los Altos, CA (US); Noel Morin, Hilo, HI (US); Annette Goodwine, Burlingame, CA (US); Vicky Sze, Santa Clara, CA (US); James Hsin, San Jose, CA (US); Elaine Fung, Cupertino, CA (US); Vered Shaviv, Los Gatos, CA (US); Reed Maltzman, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/286,212

(22) Filed: May 23, 2014

(65) Prior Publication Data

US 2014/0279226 A1     Sep. 18, 2014

Related U.S. Application Data

(63) Continuation of application No. 13/104,561, filed on May 10, 2011, now Pat. No. 9,053,504, which is a continuation of application No. 10/433,173, filed on Oct. 17, 2005, now Pat. No. 7,966,243, which is a (Continued)

(51) Int. Cl.
*G06Q 30/00* (2012.01)
*G06Q 30/06* (2012.01)
(Continued)

(52) U.S. Cl.
CPC ........ *G06Q 30/0609* (2013.01); *G06Q 30/0601* (2013.01); *G06Q 30/0641* (2013.01); *G06Q 30/08* (2013.01); *G06Q 40/00* (2013.01); *G06Q 40/04* (2013.01)

(58) Field of Classification Search
CPC .......... G06Q 30/0609; G06Q 30/0601; G06Q 30/0641; G06Q 30/08; G06Q 40/00; G06Q 40/04

See application file for complete search history.

(56) References Cited

U.S. PATENT DOCUMENTS

| 3,573,747 A | 4/1971 | Adams et al. |
| 3,581,072 A | 5/1971 | Nymeyer |

(Continued)

FOREIGN PATENT DOCUMENTS

| CA | 2253543 A1 | 3/1997 |
| FR | 2658635 A1 | 8/1991 |

(Continued)

OTHER PUBLICATIONS

"U.S. Appl. No. 09/881,911, Advisory Action mailed Nov. 2, 2005", 3 pgs.

(Continued)

*Primary Examiner* — Mary Cheung
(74) *Attorney, Agent, or Firm* — Schwegman, Lundberg & Woessner, P.A.

(57) ABSTRACT

A method and system to automatically qualify a party to participate within a network-based commerce transaction is described. The system receives information from a first party. The information relates to an item to be transacted via a network-based commerce system. The system is further to receive, from a second party, a request to be qualified to transact the item via the network-based commerce system. The system is further to transmit, to the first party, a communication comprising information relating to the second party. The system is to further receive, from the first party, a response corresponding to the automatically generated communication and, responsive to receipt of the response, to automatically perform an authorization process based on the response.

19 Claims, 21 Drawing Sheets

Related U.S. Application Data continuation of application No. PCT/US01/46426, filed on Nov. 30, 2001, which is a continuation-in-part of application No. 09/881,911, filed on Jun. 15, 2001, now Pat. No. 7,299,206.

(60) Provisional application No. 60/250,637, filed on Nov. 30, 2000.

(51) Int. Cl.
  *G06Q 30/08* (2012.01)
  *G06Q 40/00* (2012.01)
  *G06Q 40/04* (2012.01)

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,865,516 A | 9/1989 | Focke et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,862,223 A | 1/1999 | Walker et al. |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,940,807 A | 8/1999 | Purcell |
| 5,974,412 A | 10/1999 | Hazlehurst et al. |
| 5,991,739 A | 11/1999 | Cupps et al. |
| 6,012,045 A | 1/2000 | Barzilai et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,081,789 A | 6/2000 | Purcell |
| 6,085,176 A | 7/2000 | Woolston |
| 6,104,815 A | 8/2000 | Alcorn et al. |
| 6,119,137 A | 9/2000 | Smith et al. |
| 6,178,408 B1 | 1/2001 | Copple et al. |
| 6,189,003 B1 | 2/2001 | Leal |
| 6,192,407 B1 | 2/2001 | Smith et al. |
| 6,199,050 B1 | 3/2001 | Alaia et al. |
| 6,202,051 B1 | 3/2001 | Woolston |
| 6,240,396 B1 | 5/2001 | Walker et al. |
| 6,243,691 B1 | 6/2001 | Fisher et al. |
| 6,269,343 B1 | 7/2001 | Pallakoff |
| 6,578,014 B1 | 6/2003 | Murcko, Jr. |
| 6,598,026 B1 | 7/2003 | Ojha et al. |
| 6,631,356 B1 | 10/2003 | Van Horn et al. |
| 6,785,661 B1 | 8/2004 | Mandler et al. |
| 6,922,674 B1 | 7/2005 | Nelson |
| 6,947,906 B1 | 9/2005 | Underwood et al. |
| 7,277,867 B1 | 10/2007 | Brown et al. |
| 7,376,612 B1 | 5/2008 | Kwan |
| 7,461,022 B1 | 12/2008 | Churchill et al. |
| 7,596,509 B1 | 9/2009 | Bryson |
| 7,689,469 B1 | 3/2010 | Mesaros |
| 7,966,243 B2 | 6/2011 | Taylor et al. |
| 8,005,731 B1 | 8/2011 | Wolfe et al. |
| 8,140,424 B2 | 3/2012 | Taylor et al. |
| 9,053,504 B2 | 6/2015 | Taylor et al. |
| 2001/0013896 A1 | 8/2001 | Anderson |
| 2001/0049634 A1 | 12/2001 | Stewart |
| 2002/0007338 A1 | 1/2002 | Do |
| 2002/0013760 A1 | 1/2002 | Arora et al. |
| 2002/0042755 A1 | 4/2002 | Kumar et al. |
| 2002/0046187 A1 | 4/2002 | Vargas et al. |
| 2002/0049961 A1 | 4/2002 | Fang et al. |
| 2002/0052779 A1 | 5/2002 | Landesmann |
| 2002/0072945 A1 | 6/2002 | Yang |
| 2002/0174060 A1 | 11/2002 | Friedland et al. |
| 2002/0194104 A1 | 12/2002 | Reamer et al. |
| 2006/0074780 A1 | 4/2006 | Taylor et al. |
| 2008/0052218 A1 | 2/2008 | Taylor et al. |
| 2012/0123902 A1 | 5/2012 | Taylor et al. |
| 2012/0143714 A1 | 6/2012 | Taylor et al. |
| 2015/0262274 A1 | 9/2015 | Taylor et al. |

FOREIGN PATENT DOCUMENTS

| | | |
|---|---|---|
| NL | 9300266 A | 9/1994 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |

OTHER PUBLICATIONS

"U.S. Appl. No. 09/881,911, Appeal Brief filed Dec. 5, 2005", 23 pgs.
"U.S. Appl. No. 09/881,911, Decision on Appeal mailed Mar. 23, 2007", 6 pgs.
"U.S. Appl. No. 09/881,911, Examiner's Answer to Appeal Brief mailed Feb. 8, 2006", 9 pgs.

(56) References Cited

OTHER PUBLICATIONS

"U.S. Appl. No. 09/881,911, Final Office Action mailed Aug. 5, 2005", 7 pgs.
"U.S. Appl. No. 09/881,911, Non Final Office Action mailed Mar. 4, 2004", 9 pgs.
"U.S. Appl. No. 09/881,911, Non Final Office Action mailed Oct. 6, 2003", 7 pgs.
"U.S. Appl. No. 09/881,911, Notice of Allowance mailed Jun. 15, 2007", 10 pgs.
"U.S. Appl. No. 09/881,911, Preliminary Amendment filed Jun. 2, 2003", 10 pgs.
"U.S. Appl. No. 09/881,911, PTO Response to 312 Amendment mailed Aug. 10, 2007", 2 pgs.
"U.S. Appl. No. 09/881,911, Response filed Jan. 28, 2005 to Restriction Requirement mailed Sep. 29, 2004", 3 pgs.
"U.S. Appl. No. 09/881,911, Response filed Jul. 6, 2004 to Non Final Office Action mailed Mar. 4, 2004", 23 pgs.
"U.S. Appl. No. 09/881,911, Response filed Oct. 5, 2005 to Final Office Action mailed Aug. 5, 2005", 12 pgs.
"U.S. Appl. No. 09/881,911, Response filed Dec. 11, 2003 to Non Final Office Action mailed Oct. 6, 2003", 15 pgs.
"U.S. Appl. No. 09/881,911, Restriction Requirement mailed Sep. 29, 2004", 4 pgs.
"U.S. Appl. No. 10/433,173, Final Office Action mailed Jan. 12, 2010", 22 pgs.
"U.S. Appl. No. 10/433,173, Non-Final Office Action mailed Mar. 24, 2009", 35 pgs.
"U.S. Appl. No. 10/433,173, Non-Final Office Action mailed Sep. 9, 2008", 24 pgs.
"U.S. Appl. No. 10/433,173, Notice of Allowance mailed Feb. 10, 2011", 7 pgs.
"U.S. Appl. No. 10/433,173, Response filed May 12, 2010 to Final Office Action mailed Jan. 12, 2010", 21 pgs.
"U.S. Appl. No. 10/433,173, Response filed Sep. 24, 2009 to Non Final Office Action mailed Mar. 24, 2009", 20 pgs.
"U.S. Appl. No. 10/433,173, Response filed Dec. 9, 2008 to Non-Final Office Action mailed Sep. 9, 2008", 15 pgs.
"U.S. Appl. No. 11/852,868, 312 Amendment filed Jan. 25, 2012", 6 pgs.
"U.S. Appl. No. 11/852,868, Non Final Office Action mailed Apr. 7, 2011", 14 pgs.
"U.S. Appl. No. 11/852,868, Notice of Allowance mailed Oct. 26, 2011", 15 pgs.
"U.S. Appl. No. 11/852,868, PTO Response to Amendment mailed Feb. 16, 2012", 2 pgs.
"U.S. Appl. No. 11/852,868, Response filed Jul. 7, 2011 to Non Final Office Action mailed Apr. 7, 2011", 18 pgs.
"U.S. Appl. No. 13/104,561, Non Final Office Action mailed Jun. 17, 2013", 5 pgs.
"U.S. Appl. No. 13/104,561, Notice of Allowance mailed Feb. 6, 2014", 5 pgs.
"U.S. Appl. No. 13/104,561, Notice of Allowance mailed Oct. 2, 2013", 9 pgs.
"U.S. Appl. No. 13/104,561, Response filed Aug. 2, 2013 to Non Final Office Action mailed Jun. 17, 2013", 11 pgs.
"U.S. Appl. No. 13/370,040, Non Final Office Action mailed Jul. 8, 2014", 9 pgs.
"U.S. Appl. No. 13/370,040, Non Final Office Action mailed Nov. 19, 2013", 7 pgs.
"U.S. Appl. No. 13/370,040, Response filed Apr. 21, 2014 to Non Final Office Action mailed Nov. 19, 2013", 11 pgs.
"U.S. Appl. No. 13/370,040, Response filed Oct. 18, 2013 to Restriction Requirement mailed Sep. 20, 2013", 8 pgs.
"U.S. Appl. No. 13/370,040, Restriction Requirement mailed Sep. 20, 2013", 6 pgs.
"European Application Serial No. 01990829.2, Summons to Attend Oral Proceedings mailed Feb. 7, 2014", 6 pgs.
"European Application Serial No. 01990829.2—Office Action Response filed Aug. 18, 2011", 5 pgs.
"European Application Serial No. 01990829.2, Written Decision to Refuse mailed May 15, 2014", 4 pgs.
"European Application Serial No. 13158646.3, Extended European Search Report mailed Jun. 6, 2013", 7 pgs.
"European Application Serial No. 13158646.3, Office Action mailed Jul. 15, 2013", 2 pgs.
"European Application Serial No. 01990 829.2-2221, European Examination Report mailed Mar. 16, 2011", 6 Pgs.
"International Application Serial No. PCT/US00/17136 International Search Report mailed Nov. 16, 2000", 6 pgs.
"International Application Serial No. PCT/US01/12398 International Search Report mailed Aug. 27, 2001", 3 pgs.
"International Application Serial No. PCT/US01/46426, International Preliminary Examination Report mailed Nov. 2, 2003", 3 pgs.
"International Application Serial No. PCT/US01/46426, International Search Report mailed May 31, 2002", 1 pg.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pgs.
"Robert Edward Auction on Ebay of Wagner Card", Google groups, Jul. 7, 2000, 9 pgs.
Baumann, G. W, "Personal Optimized Decision/Transaction Program", IBM Technical Disclosure Bulletin, (Jan. 1995), 83-84.
Business Wire, "Mediappraise Receives National Award for Web-based Technology That Enables Companies to Solve Thorny HR Problem", Business Wire, (Dec. 14, 1998), 1-2.
Clemons, E., "Evaluating the prospects for alternative electronic securities", Proceedings of ICIS 91: 12th International Conference on Information Systems, (Dec. 16-18, 1991), 53-63.
ePier.com, "ePier.com Guidelines", Auctions, [Online]. Retrieved from the Internet: <URL: http://www.wpier.com/Guidelines.asp>, (Mar. 9, 2001), 9 pages.
Graham, Ian, "The Emergence of Linked Fish Markets in Europe", Electronic Markets. vol. 8, No. 2, (1998), 29-32.
Hauser, R., "Anonymous Delivery of Goods in Electronic Commerce", IBM Technical Disclosure Bulletin, 39(3), (Mar. 1996), 363-366.
Heins, F., ""Precautions can help keep auctions from being more than bargained for"", The San Diego Union Tribune, (Aug. 31, 1999), 3 pgs.
Hess, C. M, et al., "Computerized Loan Organization System: An Industry Case Study of the Electronic Markets Hypothesis", MIS Quarterly, vol. 18(3), (Sep. 1994), 251-275.
Janah, M., "Bogus Offers Beset Online Auction Users Anonymity Shields Newer Scams. There's No Central Reporting of Abuses, But Firms Say They're Exaggerated", Philadelphia Inquirer, (Aug. 19, 1999), 3 pgs.
Klein, Stefan, "Introduction to Electronic Auctions", Focus Theme, vol. 7, No. 4, (1997), 3-6.
Kollock, P., "The Production of Trust in Online Markets", http://www.sscnet.ucla.edu/soc/faculty/killock/papers/online_trust.htm, (Sep. 3, 2008).
Lee, H. G, "Electronic brokerage and electronic auction: the impact of IT on market structures", Proceedings of the Twenty-Ninth Hawaii International Conference on System Sciences, vol. 4, (1996), 397-406.
Lee, Ho Geun, "AUCNET: Electronic Intermediary for Used-Car Transactions", Focus Theme, Electronic Markets, vol. 7, No. 4, (1997), 24-28.
Malone, T., et al., "Electronic Markets and Electronic Hierarchies", Communications of the ACM, vol. 30, No. 6, (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
Meade, J., "Visual 360: A Performance Appraisal System That's 'Fun'", HR Magazine, Society for Human Resource Management., (Jul. 1999), 3 pgs.

(56) References Cited

OTHER PUBLICATIONS

Neo, B. S, "The implementation of an electronic market for pig trading in Singapore", Journal of Strategic Information Systems; vol. 1(5), (Dec. 1992), 278-288.

Post, D. L, et al., "Application of auctions as a pricing mechanism for the interchange of electric power", IEEE Transactions on Power Systems, 10(3), (Aug. 1995), 1580-1584 U.S. Appl. No. 13/370,040, "U.S. Appl. No. 09/881,911, 312 Amendment filed Jul. 10, 2007", 8 pgs.

Preist, Chris, et al., "Adaptive Agents in a Persistent Shout Double Auction", International Conference on Information and Computation Economies, Proceedings of the first international conference on Information and computation economies, (1998), 11-18.

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rockoff, T. E, et al., "Design of an Internet-based system for remote Dutch auctions", Internet Research: Electronic Networking Applications and Policy, vol. 5(4), (Jan. 1, 1995), 10-16.

Schmid, B. F, "The Development of Electronic Commerce", EM—Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, (1996), 6 pgs.

Warbelow, A, et al., "Aucnet: TV Auction Network System", Harvard Business School Case/Study, HBVR#9-190-001, USA, (Jul. 1989), 1-16.

Yahoo, "Yahoo, http:user.auctions.yahoo.com, Options", http:user.auctions.yahoo.com, (Mar. 13, 2001), 2 pgs.

Zwass, V., "Electronic Commerce: Structures and Issues", International Journal of Electronic Commerce, Fall 1996, vol. 1, No. 1, (Fall 1996), 3-23.

"U.S. Appl. No. 13/104,561, Non Final Office Action mailed Aug. 20, 2014", 5 pgs.

"U.S. Appl. No. 13/104,561, Notice of Allowance mailed Feb. 11, 2015", 5 pgs.

"U.S. Appl. No. 13/104,561, Response filed Jan. 20, 2015 to Non Final Office Action mailed Aug. 20, 2014", 20 pgs.

"U.S. Appl. No. 13/370,040, Examiner Interview Summary maiiad Dec. 23, 2015", 3 pgs.

"U.S. Appl. No. 13/370,040, Final Office Action mailed Nov. 12, 2015", 16 pgs.

"U.S. Appl. No. 13/370,040, Response filed Jan. 26, 2015 to Non Final Office Action mailed Jul. 8, 2014", 20 pgs.

"U.S. Appl. No. 13/370,040, Response filed Nov. 10, 2014 to Non Final Office Action mailed Jul. 8, 2014", 20 pgs.

"U.S. Appl. No. 14/726,583, Preliminary Amendment filed Aug. 11, 2015", 8 pgs.

FIG. 3 ebay™ home | my-eBay | site map | sign in

| Browse | Sell | Services | Search | Help | Community |
| overview | registration | buying and selling | my eBay | about me | feedback forum | safe harbor |

▶ Check out LIVE auctions on eBay

[ Search ]  tips

☐ Search titles and descriptions

Pre-Approve Bidders

Create your own pre-approved bidder list for any item and only allow those on your list to bid.
Please use this feature cautiously as it may limit the number of bids on your item.

Your User ID: [ 202 ]
You can also use your email address

Your Password: [ 204 ]
Forgot your password?

Are you tired of typing in your User ID and Password over and over
again? Save time by signing in. (You may also sign in securely).

200

Pre-Approve Bidders

Here's what you can do:

- To add and remove bidders from your list click Edit.
- To deactivate this feature and allow all users to bid click Deactivate.
- You and edit or deactivate your pre-approved bidder list up until your listing ends.

Items with Pre-Approved Bidders

| Item | Title | Time Left | Actions |
|---|---|---|---|
| 123456789 | Paul McCARTNEY's songs PIANO notes <br> 302 | 0d 10h 50m | Edit Deactivate <br> 306  308 |
| 123456789 | Paul McCARTNEY's songs PIANO notes + lyrics <br> 304 | Ended | View |

+ Add a new item with pre-approved bidders
310

Pre-Approve Bidders

Edit Item

Edit your approved bidders in the box below. View tips to pre approve your bidders.

| Item No. | 12345678 — 402 |
|---|---|
| Add or remove pre-approved bidders | Enter each bidder's User's IDs. Place a comma between each User ID or just press the Enter key on your keyboard to display each name on a separate line. View an example.<br><br>vicky123<br>vicky12<br>vicky1 — 404<br>teddiedd<br>mickcik<br>johnre<br>mautau |

400

FIG. 5 eB....21 PDT) - PETER PAN INN URBANA, MARYLAND glas Page 2 of 3

| BIDDING |
|---|

| PETER PAN INN URBANA, MARYLAND glass<br>Item #470476060<br><br>Notice: This listing is restricted to pre-approved bidders only.<br><br>See if you're allowed to bid on this item<br><br>Opening bid: $2.00<br><br>Your maximum bid: [ ]<br><br>(Minimum bid: $2.00)<br><br><br>510<br><br>eBay will bid incrementally on your behalf up to your maximum bid, which is kept secret from other eBay users. The eBay term for this is proxy bidding.<br><br>Your bid is a contact - Place a bid only if you're serious about buying the item. If you are the winning bidder, you will enter into legally binding contract to purchase the item from the seller. | How to Bid<br><br>1. Register to bid - if you haven't already. It's free!<br>2. Learn about this seller - read feedback comments left by others.<br>3. Know the details - read the item description and payment & shipping terms closely.<br>4. If you have questions - contact the seller susan1073 *before* you bid.<br>5. Place your bid!<br>eBay purchases are insured. |

Dear <Buyer name>

This item is restricted to pre-approved bidders. You may place a bid once this seller has approved you. In order to get approved, you'll need to contact the seller and request to be added to the pre approved bidder list for this item.

METHOD AND SYSTEM TO AUTOMATICALLY QUALIFY A PARTY TO PARTICIPATE WITHIN A NETWORK-BASED COMMERCE TRANSACTION

CROSS-REFERENCE TO RELATED PATENT DOCUMENTS

This patent application is a continuation of U.S. patent application Ser. No. 13/104,561, filed on May 10, 2011, which is a continuation of U.S. patent application Ser. No. 10/433,173, filed on Oct. 17, 2005, which is a continuation of International Application No. PCT/US2001/046426 (WO 2002044860), filed Nov. 30, 2001, which is a continuation-in-part of U.S. patent application Ser. No. 09/881,911, filed Jun. 15, 2001, which claims the priority benefit of U.S. Provisional Patent Application Ser. No. 60/250,637, filed Nov. 30, 2000 and all of which are incorporated herein by reference in their entirety.

FIELD OF INVENTION

The present invention relates to network-based and electronic commerce. Specifically, the present invention provides for a first party to specify a criterion (or multiple criteria) to be satisfied by a second party to quantify the second party to participate within a network-based commerce transaction facilitated by a network-based commerce facility such as, for example, an Internet-based shopping or auction facility.

ART BACKGROUND

More and more Internet users are realizing the ease and convenience of buying and selling online by way of person-to-person online trading (or transaction processing) pioneered by eBay Inc., the assignee of the present invention. As a result, collectors, hobbyists, small dealers, unique item seekers, bargain hunters, and other consumers are able to buy and sell millions of items at various online shopping sites.

The success of the online shopping sites, such as the Internet-based shopping facilities, depends upon their ability to provide enjoyable shopping experiences and easy-to-use and reliable environments in which buyers and sellers can conduct business efficiently. The online shopping sites can offer their services by facilitating auctions or by allowing sellers to offer their offerings for fixed prices. The current Internet-based shopping facilities have been presented with public relations risks due to excessive bid retraction and cancellation activities. For example, the reputation of eBay Inc. as a safe trading place was threatened because of the excessive bid retraction and cancellation activities during the recent auction of the Titanic deck chair and other high profile listings. It is estimated that as many as eighty percent of the bids made on the Internet-based shopping facilities are bogus.

Network-based commerce has of course found broad application beyond person-to-person trading, and is extensively used to perform business-to-business (B2B) trading. Within the B2B environment, a party (e.g., potential buyer) may engage in a transaction activity or have a profile that is undesirable from the perspective of a further party (e.g., a potential seller).

In the light of the foregoing, there is a need to enhance the trust and confidence within online transaction facilities. Particularly, it would be valuable and useful to provide a party to an online transaction with a degree of confidence that a further party is sincere and qualified to engage in a transaction process.

SUMMARY OF THE INVENTION

According to one aspect of the present invention, there is provided a method to facilitate computer-based commerce. Item information relating to an item to be transacted via a computer-based commerce system is received from a first party. Criterion information specifying at least one criterion to be satisfied by a second party in order for the second party to be qualified to transact for the item via the computer-based commerce system is received from the first party. An automatic determination is made as to whether the second party satisfies the at least one criterion and if so, then the second party is automatically qualified to transact for the item via the computer-based commerce system.

According to a further aspect of the present invention, there is provided a method to facilitate network-based shopping. A communication between a network-based auction facility and a seller is facilitated whereby the seller authorizes a bidder to bid on an offering offered for sale by the seller is disclosed. Furthermore, the method comprises automatically recording the bidder as authorized to bid on the offering responsive to the communication.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements, and in which:

FIG. 3 illustrates an exemplary pre-approve bidders main web page for an exemplary Internet-based auction facility.

FIG. 4 illustrates an exemplary pre-approve bidders logon web page for an exemplary Internet-based auctions facility.

FIG. 5 illustrates an exemplary pre-approve bidders form web page for an exemplary Internet-based auctions facility.

FIGS. 6A and 6B illustrate an exemplary view item web page for an exemplary Internet-based auction facility.

FIG. 6C illustrates an exemplary error message.

DETAILED DESCRIPTION

Figure 1:
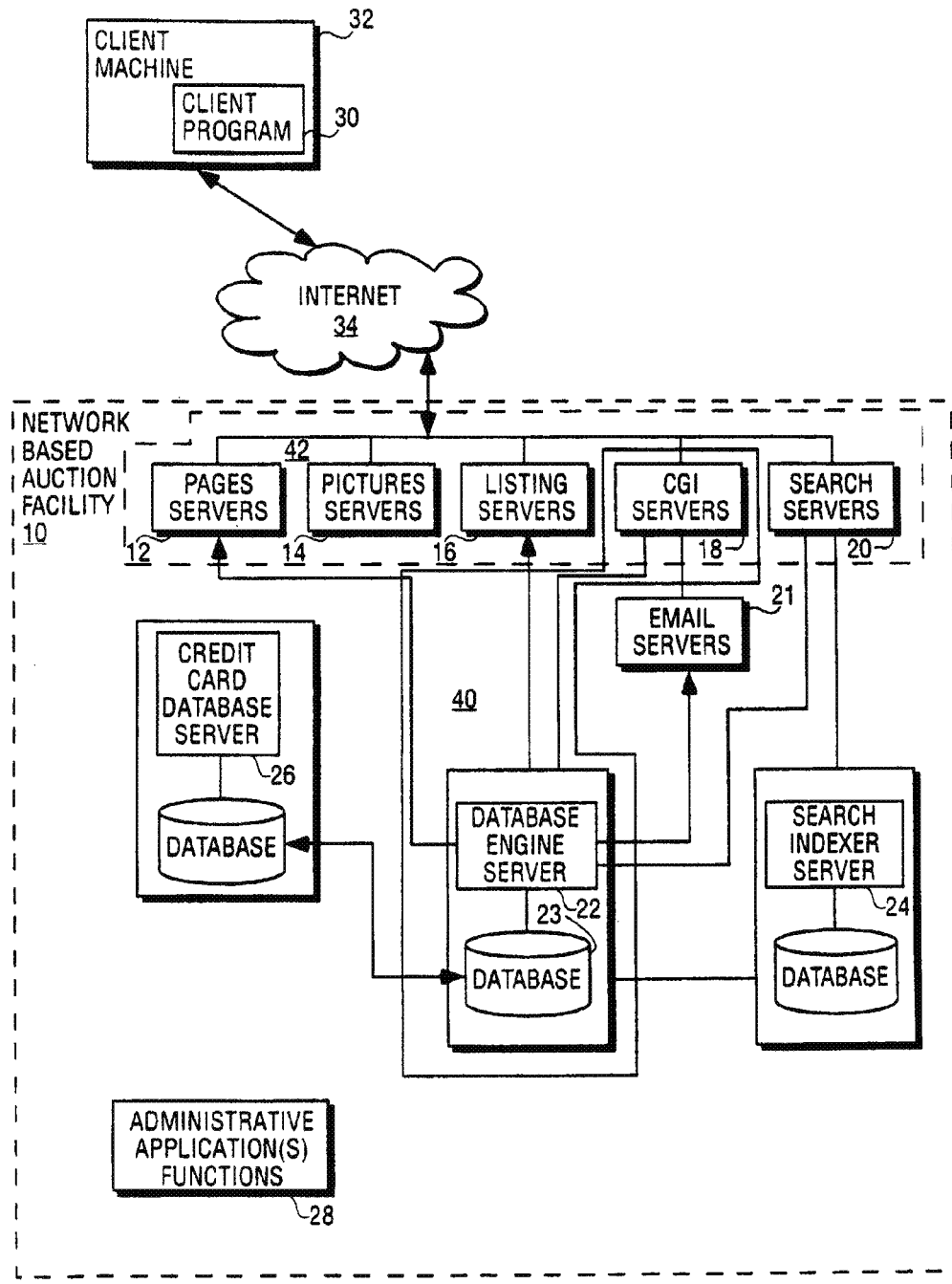
FIG. 1 is block diagram illustrating an exemplary network-based commerce facility in the form of an Internet-based auction facility.

A method and system to qualify for a party to transact with respect to an item via a network-based commerce system are described. In one embodiment, this qualification is manually performed by implementing seller-authorized transacting privileges. In one embodiment, and the present invention proposes a method and system whereby a first party (e.g., a seller) can authorized transacting privileges (e.g., buying privileges) for a second party (e.g., a buyer) to transact for an item message dated with the first party. The transacting privileges can include, for example, the authorization to bid on an auction listing of the first party and/or the authorization to offer to buy a fixed price listing of the first party. A listing may, for example, relate to an item. In this description, the terms listing and item and offering are used interchangeably. Unauthorized bidders named the disabled (or barred) from transacting for an item.

An advantage of one embodiment of the present invention is that a first party (e.g., a seller) does not manually have to monitor transacting activities because only the parties manually pre-approved by the first party, or automatically qualified by the commerce system utilizing predefined criteria specified by the first party, are allowed to transact (e.g., bid on or offer to buy) for an item associated with the first party. The shoppers (or potential buyers) also benefit from this embodiment of the present invention because a healthier trading environment is created because only the pre-approved (or qualified) candidates are allowed to compete for a particular item. The community of users of a commerce system benefits in general because the commerce system is perceived to facilitate worthwhile transacting because only the serious party's are allowed to transact for an item (e.g., bid on and offer to buy the listings). As seller authorized buying privileges can be requested by any seller with privileges to list on the commerce system (e.g., a shopping facility) and for any listing, although the sellers with high profile listings would have more interest to do so. The present invention is finds particularly application for high profile items (e.g., charity listings, special events and holiday promotions).

In the at least part of ensuing description, a method and system to qualify a party to transact with respect to an item utilizing a commerce system in the exemplary form of network-based auction facility are described. It will be appreciated that the method and system are also applicable to a commerce system in the form of a network-based fixed-price facility or a commerce system that provides a multitude of transaction processes (e.g., any number of types of auction transaction processes and any number of fixed-price transaction processes). In various embodiments of the present invention, a first party is empowered to use different mechanisms to qualify for the parties to transact for a particular item. For example, considering an auction facility as an example of a commerce system, a seller may view a potential bidder's bidding history and profile to determine whether or not to pre-approve the bidder to bid on a listing. It is understood that if the vetting process is too strict, the conversion rate on the item will be affected. To mitigate, in one embodiment, the commerce system educates the sellers to use proper vetting mechanism to choose their bidders. Also, in one embodiment, the seller may remove the pre-approval restriction anytime during the auction. For example, the seller may wish to take the risk to open the listing to all potential bidders if the pre-approval restriction produces no bids or the bids amounts are low. In one embodiment, the seller may add and remove the pre-approval restriction multiple times during the auction.

In one embodiment, the seller may remove a bidder from the pre-approved list after the seller has added the bidder to the pre-approved list. In one embodiment, the seller may add bidders to and remove bidders from the pre-approved list multiple times during the auction of the listing. In one embodiment, the seller may request the pre-approval of bidders for his/her listing without specifying any bidders initially, and then add the bidders to the pre-approved list from time to time. In one embodiment, the seller has the choice to apply the pre-approve bidders list from a prior or current listing to all on-going listings with the auction facility and/or any future listings. In one embodiment, the seller may pre-approve the bidders individually or in a bulk. In one embodiment, the seller may view the list of the pre-approved bidders and their respective Usernames/email addresses by logging on to the auction facility web site and providing the listing identification number.

In one embodiment, the parties within a specific geographical region (e.g. the United States of America) may be automatically pre-approved to bid on an item. In one embodiment, only the predetermined currencies can be used to bid on a listing.

In the following description, for purposes of explanation, numerous specific details are set forth in order to provide a thorough understanding of the present invention. It will be evident, however, to one skilled in the art that the present invention may be practiced without these specific details.

For the purposes of the present specification, the terms "items" shall be deemed to include products, goods and services. The term "party" shall be deemed to include any party (human or automated) that is capable of transacting for an item or utilizing commerce system. The term "party" shall accordingly include buyers, sellers, shoppers, customers, bidders etc.

Qualification/Disqualification of a Party to Transact—Auction Facility Exemplary Embodiment FIG. 1 is block diagram illustrating an exemplary commerce system in the form of an Internet-based auction facility 10. While an exemplary embodiment of the present invention is described within the context of an auction facility 10, it will be appreciated by those skilled in the art that the invention will find application in many different types of computer-based, and network-based, commerce systems.

The auction facility 10 may be viewed as including an authorization module 40 and a communications module 42. The authorization module 40 includes the CGI servers 18 (or application servers) that provide an intelligent interface to the back-end of the auction facility 10, database engine server 22 and database 23. The communications module 42 includes one or more of a number of types of front-end servers, namely the page servers 12 (or Web servers) that deliver web pages (e.g., markup language documents), picture servers 14 that dynamically deliver images to be displayed within Web pages, listing servers 16, CGI servers 18, and search servers 20 that handle search requests to the facility 10. E-mail servers 21 provide, inter aria, automated e-mail communications to the users of the auction facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the auction facility 10 via a network such as, for example, the Internet 34. The sellers and the buyers (or bidders) access the auction facility through the client machines 32. Other examples of networks that a client may utilize to access the auction facility 10 include a wide area network (WAN), a local area network (LAN), a wireless network (e.g., a cellular network), the Plain Old Telephone Service (POTS) network or as the Public Switched Telephone Network (PSTN).

Figure 2:
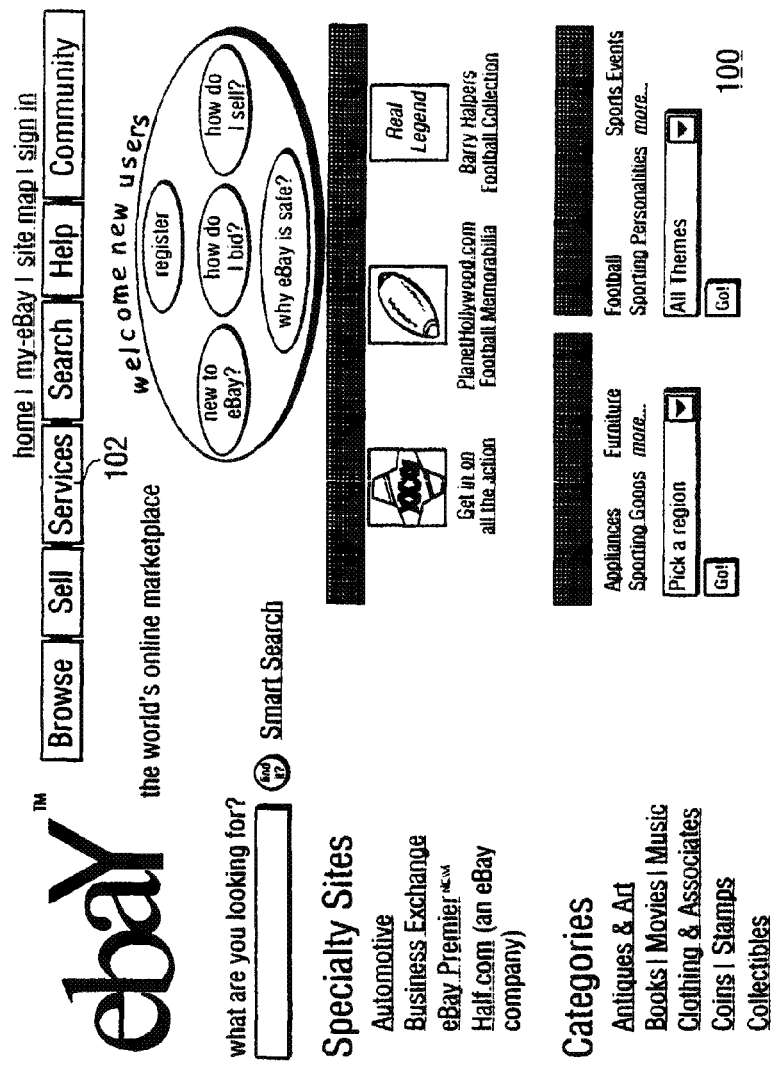
FIG. 2 illustrates the web home page for an exemplary Internet-based auction facility.

FIG. 2 illustrates an exemplary web home page 100 that may be generated by the Internet-based auction facility 10. The home page 100 includes a "seller services" link 102, which provides access to the seller services page. The seller services page, in turn, includes a buying and selling tools link, which provides access to the buying and selling tools page. The buying and selling tools page, in turn, includes a pre-approve bidders link, which provides access to the pre-approve bidders logon web page.

FIG. 3 illustrates an exemplary pre-approve bidders logon web page 200 that may be generated by the Internet-based auction facility 10. The pre-approve logon page 200 prompts the seller to provide a proper username 202 and password 204. When the seller provides the proper username 202 and password 204, the logon page 200 provides access to the pre-approve bidders main web page.

FIG. 4 illustrates an exemplary pre-approve bidders main web page 300 that may be generated by the Internet-based auction facility 10. The pre-approve bidders main page 300 displays currently active auction listings 302 and past auction listings 304 for the particular seller. The pre-approve bidders main page 300 includes an "edit" link 306, which allows the seller to edit the pre-approve bidders list for the corresponding listing 302. The editing can include adding bidders to or subtracting bidders from the pre-approve bidders list. The pre-approve bidders main page 300 also includes a "deactivate" link 308, which allows the seller to deactivate the pre-approve bidders list such that the shoppers need not seek the seller's authorization to bid on the listing, if the seller removes the pre-approval restriction during an auction, the auction facility 10 requests the seller to inform the (pre-approved bidders that the listing is now available to all potential bidders. In one embodiment, the seller can inform the pre-approved bidders of the removal of the pre-approval restriction through email. The pre-approve bidders main page 300 also includes an "add a new item" link 310, which provides access to the pre-approve bidders form page.

Figure 6A:

FIG. 5 illustrates an exemplary pre-approve bidders form web page 400 generated by the Internet-based auction facility 10. The pre-approve bidders form page 400 prompts the seller to provide an item number 402. The item number 402 can be provided by the auction facility 10 and corresponds to the item for which the seller wishes to pre-approve the bidders. The form page 400 also prompts the seller to add or remove the identifiers 404 for the bidders whom the seller wishes to authorize to bid on the particular item. The identifier 404 can include the bidder Username. The bidder identifiers 404 that are added to the form page 400 are stored in an authorized bidders table described below with reference to FIG. 7. The view item web page described below with references to FIGS. 6A and 6B is updated to include the information submitted through the form page 400. In one embodiment, if the seller's username 302 does not match with the item number 402, the auction facility 10 prompts an error message asking the seller to recheck the item number 402. In one embodiment, if the Username for the bidder does not match with a Username in the bidder table in the database 23, the auction facility 10 prompts an error message indicating that the bidder is not registered, suspended, terminated or merged.

FIGS. 6A and 6B illustrate an exemplary view item web page 500 generated by the Internet-based auction facility 10. If the seller has requested pre-approval restriction for the item, the auction facility 10 flashes an error message 520 when the unauthorized bidders attempt to bid on the item. An exemplary error message 520 is illustrated in FIG. 6C. The error message 520 advises the unauthorized bidder to contact the seller to seek the pre-approval to bid. The error message 520 can appear in the bidder box area 510. In one embodiment, if the potential bidder is on the pre-approve bidders list to bid on this item, the auction facility 10 prompts him/her with a message to continue with the bidding process.

The view item page 500 includes an "about me" page link 502, which provides access to an about me web page. The unauthorized bidders may visit the about me page for more details regarding the seller, including the seller's vetting process/guidelines. In one embodiment, the "about me" page link 502 is added in the item description area 504. In one embodiment, when the seller removes the pre-approval restriction, the restricted message is removed from the bid box area. In one embodiment, the seller can request pre-approval restriction after the auction has begun fir the remaining time on the auction. In such a case, in one embodiment, the seller can manually cancel the bids made prior to the implementation of the pre-approval restriction.

Database Structure

The auction facility 10 provides the seller with information regarding the potential bidder such that the seller can make an informed determination regarding whether to pre-approve the bidder. The information may include the bidder's bidding history and feedback profile. The information is included in the database 23. In one embodiment, the seller provides the auction facility 10 with the bidder contact information to obtain information regarding the bidder. The bidder contact information can include the bidder Username or email address. The seller may obtain the bidder contact information directly from the bidder or from the auction facility 10. In one embodiment, the auction facility 10 matches the contact information provided by the seller with the contact information stored in the database 23 to provide the seller with user information.

Figure 7:
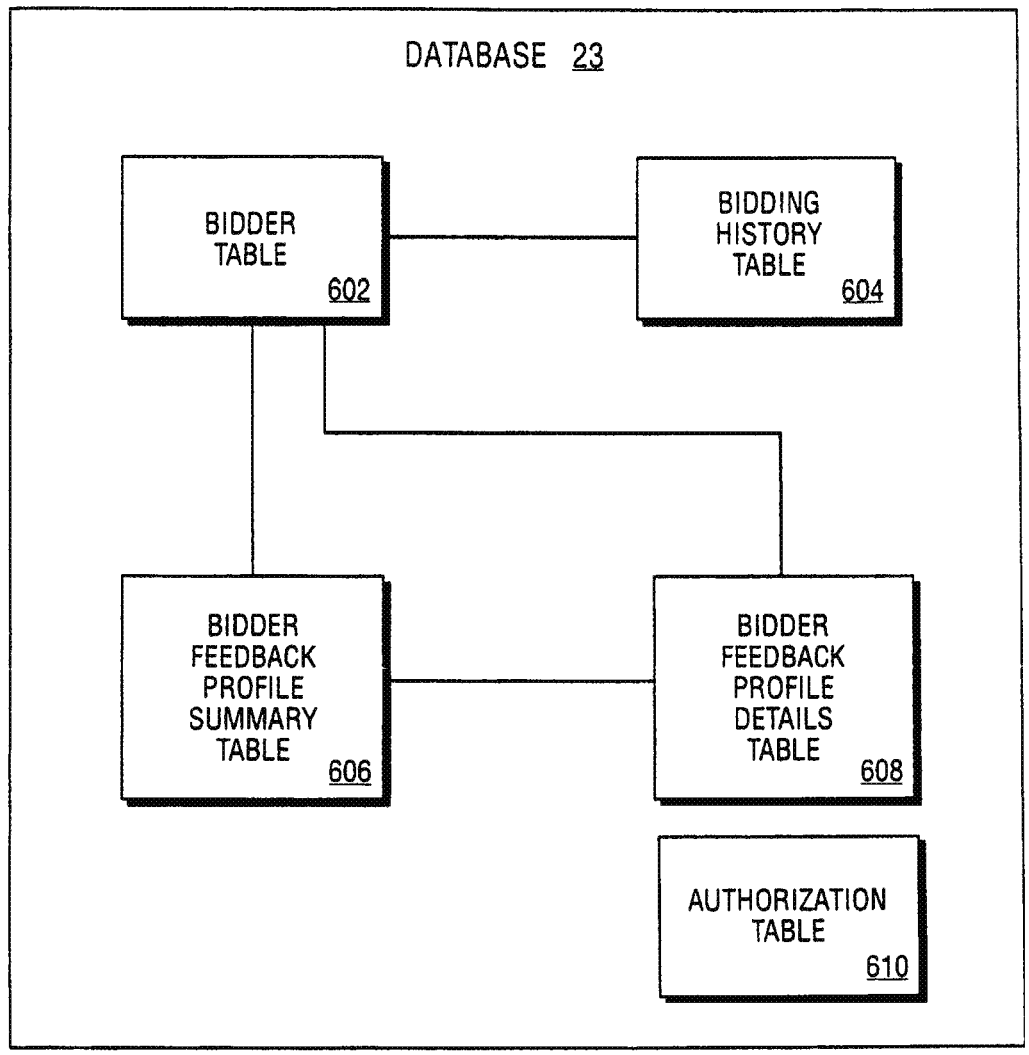
FIG. 7 is a database diagram illustrating an exemplary database for the Internet-based auction facility.

FIG. 7 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of objects in an object-oriented database.

The database 23 includes a bidder (or party) table 602, which contains a listing of the registered bidders of the auction facility 10. The bidder table 602 can also be referred to as the user table because each user may operate as both a bidder and a seller within the auction facility 10. The bidder table includes a link to a bidding history table 604 for each registered bidder. Each bidding history table 604 is populated with the particular bidder's bidding history records. Each bidding history record may include, inter alia, the title of a listing that was/is being auctioned via the auction facility 10, the bidder's bidding amount, and bid retraction information. The bid retraction information indicates whether the bidder retracted his/her bid on a particular item. Two other tables are also shown linked to the bidder table 602, namely a bidder feedback profile summary table 606 and a bidder feedback profile details table 608. The database 23 also includes an authorized bidders table 610 for each item for which the seller has requested the pre-approval of the bidders. The authorized bidders table 610 includes the list of bidders identifiers 404 that are authorized to bid on the particular item. The bidder identifier 404 can include the bidder Username.

Figure 8:
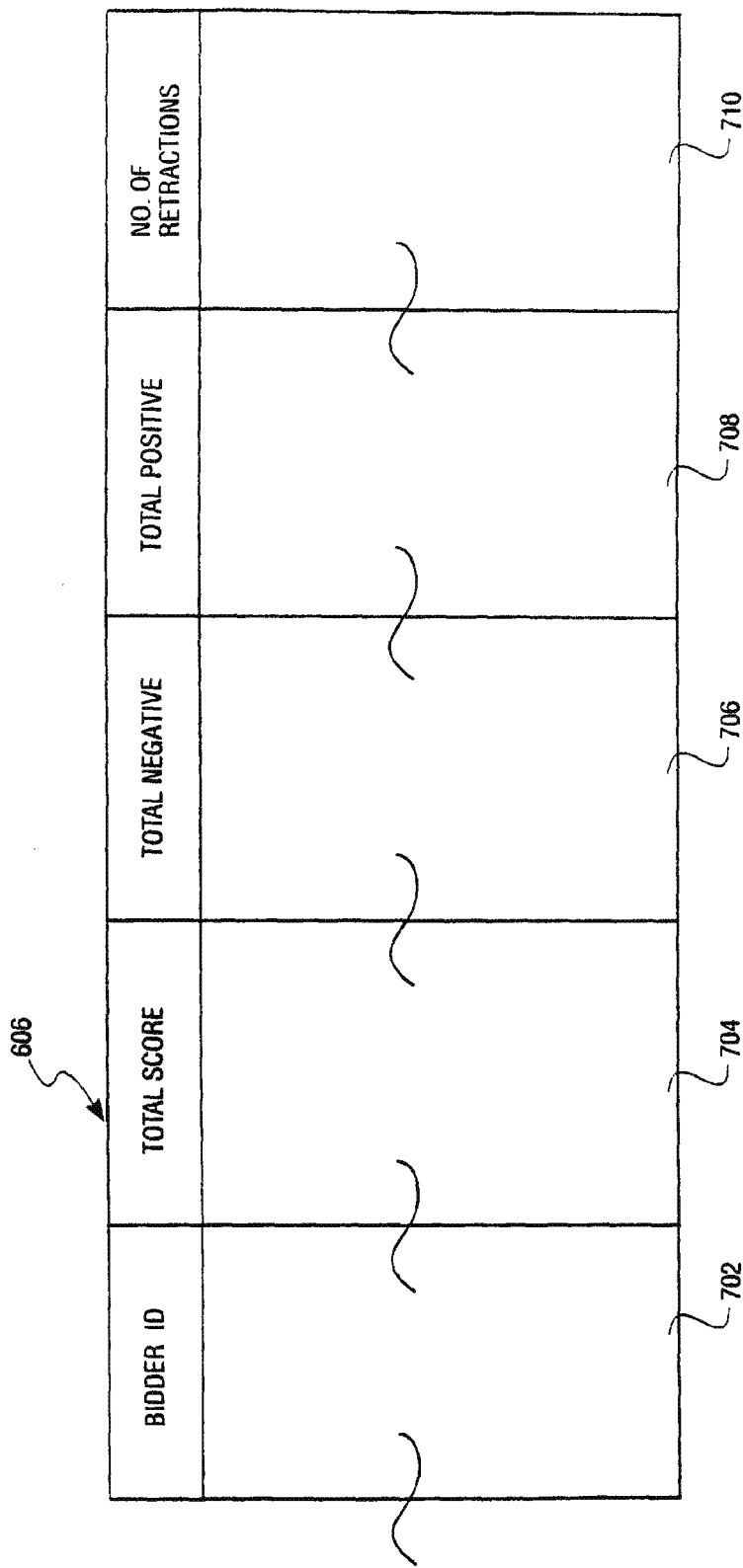
FIG. 8 is a diagrammatic representation of an exemplary embodiment of the bidder feedback profile summary table.

FIG. 8 is a diagrammatic representation of an exemplary embodiment of the bidder feedback profile summary table 606. The summary table 606 stores a summary of the feedback information regarding the bidders. Sellers and bidders that have experienced a particular bidder's behavior during the past auctions provide the feedback information (or comments) regarding to the bidder. The summary table 606 includes a bidder identifier column 702 that stores, for each bidder, a bidder identifier providing a pointer to the bidder table 602. The total score column 704 stores the total number of feedback comments (e.g., negative, positive and neutral) received for each bidder. The total negative column 706 stores the total number of negative feedback comments received for each bidder, and the total positive column 708 similarly stores the total number of positive feedback comments received for each bidder. The number of retractions column 710 stores the total number of threads that each bidder has retracted from auctions.

The summary table 606 provides a summary of the impressions of the users of the auction facility 10 regarding a particular bidder. Each bidder of the summary table 606 is linked to a bidder feedback profile details table 608. It is contemplated that other embodiments of the summary table 606 can include additional information, such as whether the bidder has a credit card on file with the auction facility 10 and whether the bidder is agreeable to use of an online payment service (e.g., Billpoint).

Figure 9:
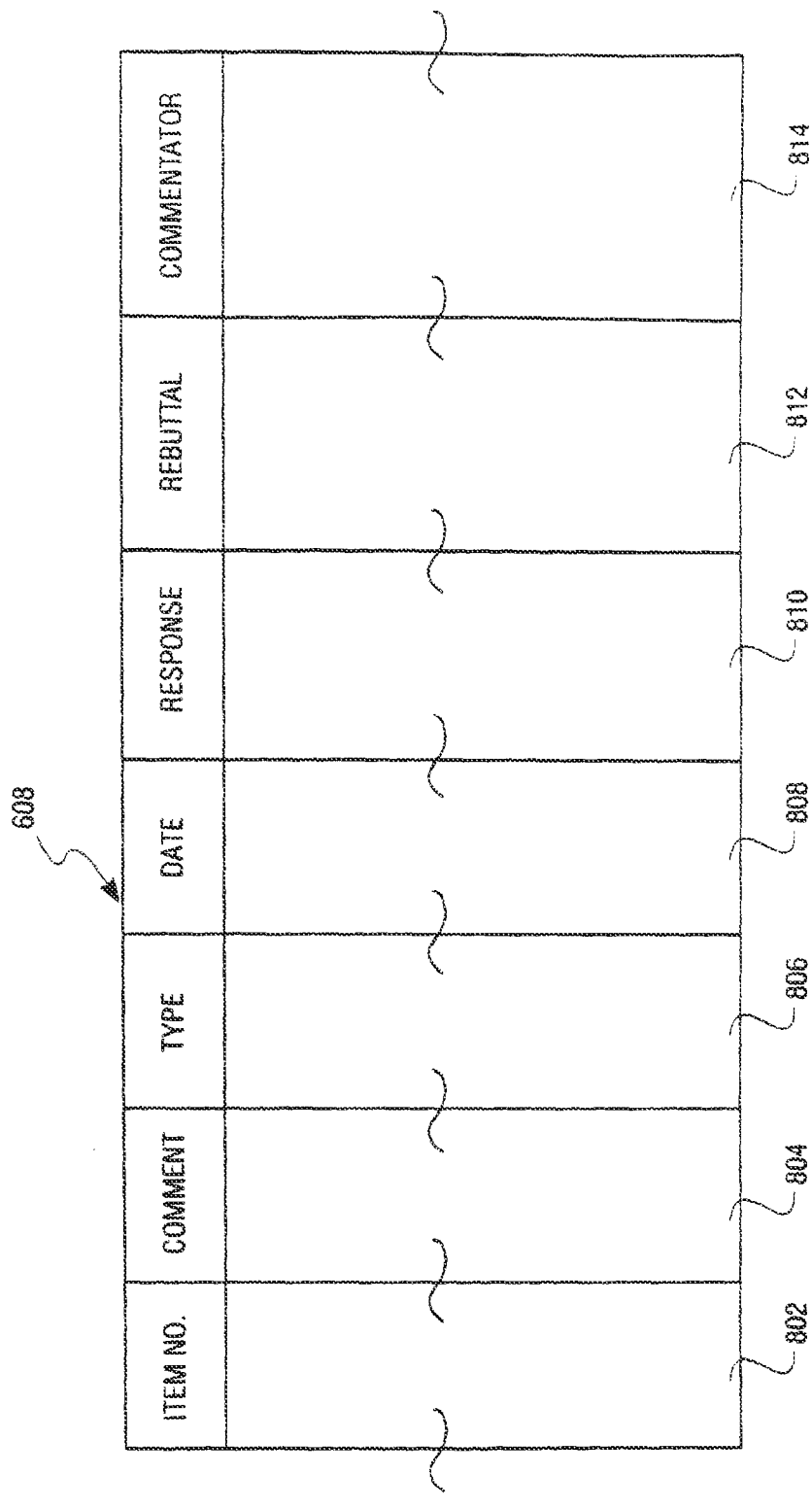
FIG. 9 is a diagrammatic representation of one exemplary embodiment of the bidder feedback profile details table.

FIG. 9 is a diagrammatic representation of one embodiment of the bidder feedback profile details table 608. The details table 608 is populated with entries reflecting the details of each feedback comment or opinion submitted by users to the auction facility 10 regarding a particular bidder. Typically, the users submitting the comments include sellers on whose auction listings the bidder has bid in the past. In one exemplary embodiment, the users are only permitted to provide feedback pertaining to a transaction upon conclusion of that transaction. The feedback details table 608 includes the item number column 802 that identifies the items for which the comments were submitted. The comment column 804 stores the actual texts of the feedbacks, comments, or opinions. The type column 806 stores the indications as to whether the comments are positive, negative or neutral. The date column 808 stores the dates on which the feedbacks, comments or opinions were received. The response column 810 stores the texts of the responses submitted by the bidder in response to the comments texts stored in column 804. Similarly, the rebuttal column 812 stores the texts of the rebuttals to such responses. The commentator column 814 stores the identifiers of the users that submitted the original comments stored in column 804. It is appreciated that further dates and other descriptive information may also populate the details table 608.

The tables 602, 604, 606 and 608 include information that can provide the seller with valuable insights when evaluating a potential bidder. In one embodiment, the information contained in the tables 602, 604, 606 and 608 is easily accessible to the sellers. In one embodiment, the seller can provide the bidder's identifier such as the Username or email address to access the information stored in the tables 602, 604, 606 and 608. It is contemplated that the databases of alternate embodiments can include additional tables that provide additional bidders related information.

Figure 10:
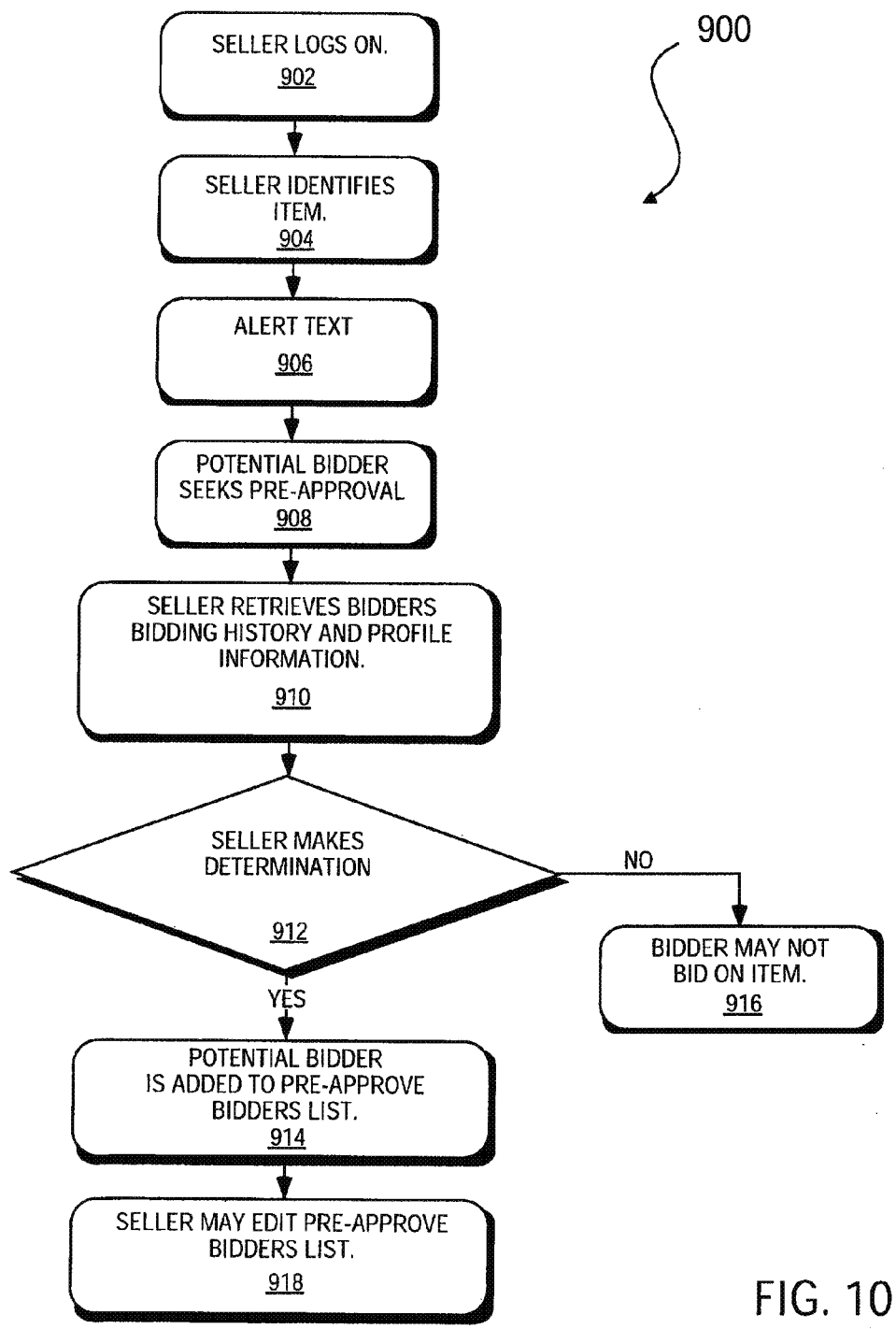
FIG. 10 illustrates the flow chart of one embodiment of the method for seller authorized bidding through an Internet-based auction facility.

FIG. 10 illustrates the flow chart of one embodiment of a method for seller authorized bidding through an Internet-based auction facility 10. It will be appreciated by those skilled in the art that with certain modifications the method is applicable in many different types of computer-based, and network-based, commerce systems.

At block 902, a seller registered with the auction facility 10 logs on to a website that provides access to the auction facility 10. If the seller were already logged on, then he/she need not logon again to use request the pre-approval restriction. The suspended, merged, or terminated seller who cannot use any other feature on the auction facility 10 is prohibited from using the seller authorized bidding feature.

At block 904, the seller identifies the item for which he wishes to add the pre-approval restriction. At block 906, an alert text appears on the item web page to alert the potential bidders to get a pre-approval from the seller to bid on the item. The item web page or another web page linked to the item web page provides the potential bidder with the seller contact information and vetting process information. At block 908, the potential bidder contacts the seller and requests permission to bid on the item. In one embodiment, the bidder must be registered with and logged on to the auction facility 10. The bidder provides the seller with a bidder identifier, such as the Username or email address. At block 910, the seller uses the bidder identifier to retrieve and view the bidder's bidding history and profile information. At block 912, the seller determines whether to add the bidder to the pre-approve bidders list (i.e., whether to qualifying the bidder to transact (e.g., bid) for the item). At block 914, if the determination is positive, the seller adds in the bidder identifier identifying the potential bidder to the pre-approve bidders list. The bidder identifier is then added to an appropriate authorization table within the database 23. At block 916, if the determination is negative, the bidder identifier is not added to the authorization table. In one embodiment, the potential bidder is informed through email that the seller has rejected his/her request for pre-approval. At block 918, the seller may edit the pre-approve bidder list. The editing can include the addition of the potential bidder to the list that was rejected at block 912. The editing can also include the removal of a bidder from the list.

When a bidder attempts to bid on an item, the authorization module 40 checks whether the bidder identifier is included in the item authorization table. If the bidder identifier is included in the item authorization table, the bidder is allowed (or enabled) to bid on the item. If the bidder identifier is not included in the item authorization table, the bidder receives an error message.

Automatic Qualification/Disqualification of a Party to Transact

The embodiment of the present invention described above implemented a partially manual qualification/disqualification process where a first party (e.g., a seller) manually qualified or disqualified a second party (e.g., a potential buyer) to transact for an item via a network-based commerce system (e.g., of the auction facility 10). The qualification of the second party was performed by having the first party submit identification criteria (e.g. a username or e-mail address), identifying the second party, to the network-based commerce system. The network-based commerce system then automatically qualifies the second party to transact for an item when the second satisfies the identification criterion (i.e., when the identity of the second party is confirmed through an appropriate login process).

A further embodiment of the present invention is described below wherein the automatic qualification of the second party to transact for an item within a commerce system may be performed utilizing a broader scope of criteria than only identification criteria. In this way, a first party (e.g., seller) can potentially have a to the commerce system automatic qualify or disqualify a second party from transacting with respect to a specific item, or with respect to a number of items, associated with the first party without requiring that the first party manually approve or disapprove the second party.

Figure 11:
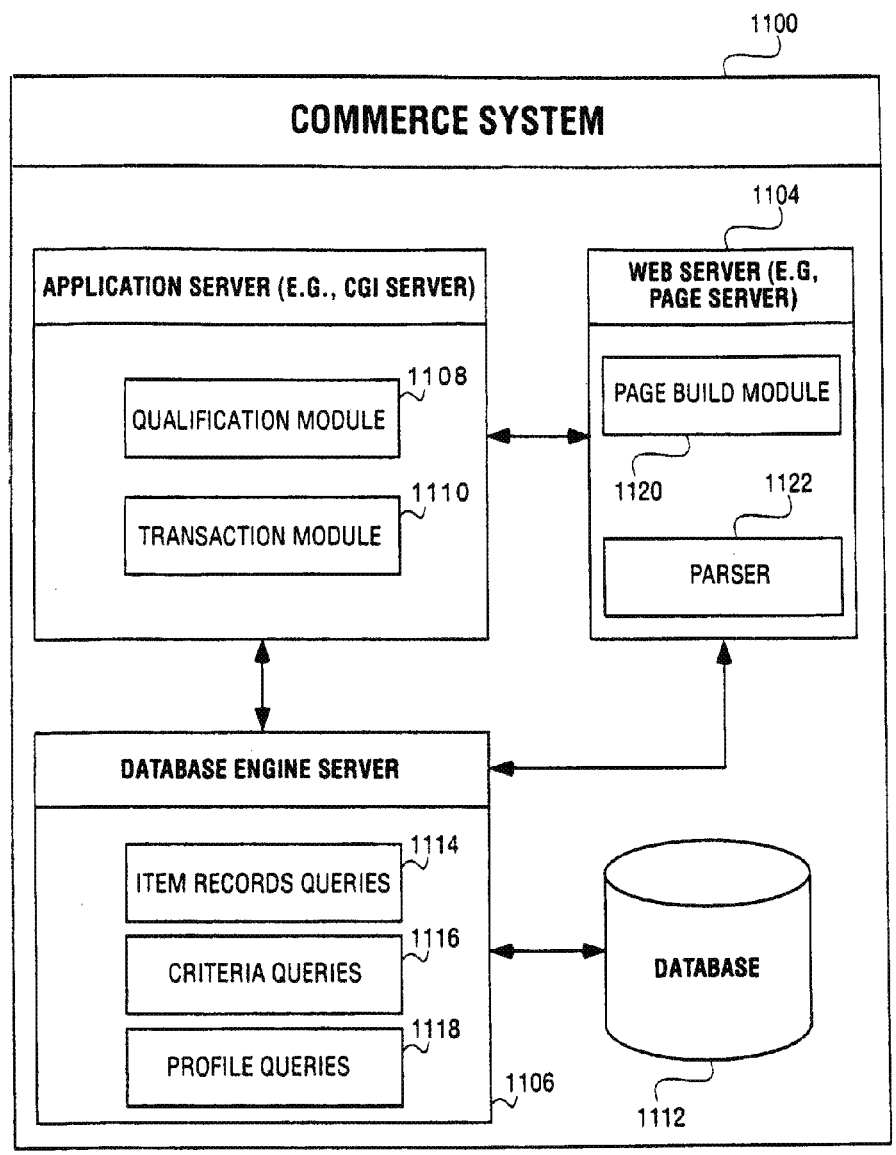
FIG. 11 is a block diagram illustrating an exemplary commerce system that may at least partially perform an automatic qualification, or disqualification, of a second party to transact for an item.

FIG. 11 is a block diagram illustrating an exemplary commerce system 1100 that may at least partially perform the automatic qualification, or disqualification, of a second party to transact for an item. The commerce system 110 may implement any one or more of a number of transaction processes, such as auction, fixed price, reverse auction, declining price auction, or bulk-purchase processes. The commerce system 1100 illustrated in FIG. 11 includes an application server 1102 (e.g., the CGI server 18 illustrated in FIG. 1) that communicates with a web server 1104 (e.g., a page server 112 as illustrated in FIG. 1) and a database engine server 1106 (e.g., the database engine server 22 illustrated in FIG. 1). The application server 1102 hosts a number of application modules that perform functions related to the operation of the commerce system 1100. For example, the application server 1102 is shown to include a qualification module 1108 that operates, in a manner described below, to qualify parties to transact with respect to an item via the commerce system 110. The application server 1102 also incorporates a transaction module 1110 that operates to implement a transaction process (e.g., an auction or fixed price transaction process) via which an item may be transacted between two or more parties.

Data required by the various modules of the application server 1102 is requested by, and communicated to, the application server 1102 from the database engine server 1106. To this end, the database engine server 1106 may host a number of queries, or stored procedures, that operate to retrieve requested data from a database 1112. For example, the database engine server 1106 is shown to host item records queries 1114, criteria queries 1116 and profile queries 1118. The utilization of these queries will be described in further detail below.

The application server 1102 also communicates data to, and receives data from, a web server 1104. The web server 1104 is responsible, in one embodiment, for the generation and transmission of user interface information (e.g., a markup language document such as an HTML document) that may be utilized by a client application (e.g., a browser) executing on a computing device (e.g., a personal computer, Personal Digital Assistant (PDA), mobile telephone, etc.) to generate a user interface for the display of data to, and the receipt of data from, a user of the commerce system 110. To this end, the web server 1104 is shown to include a page build module 1120 to construct user interface information and a parser 1122 utilized to deconstruct data transmissions received via a communications network (e.g., the Internet 34).

Having now provided an architectural description of an exemplary commerce system 1100, a description of the operation of the exemplary commerce system 1100 will be provided below with reference to a number of flow charts and user interface diagrams.

Figure 12:
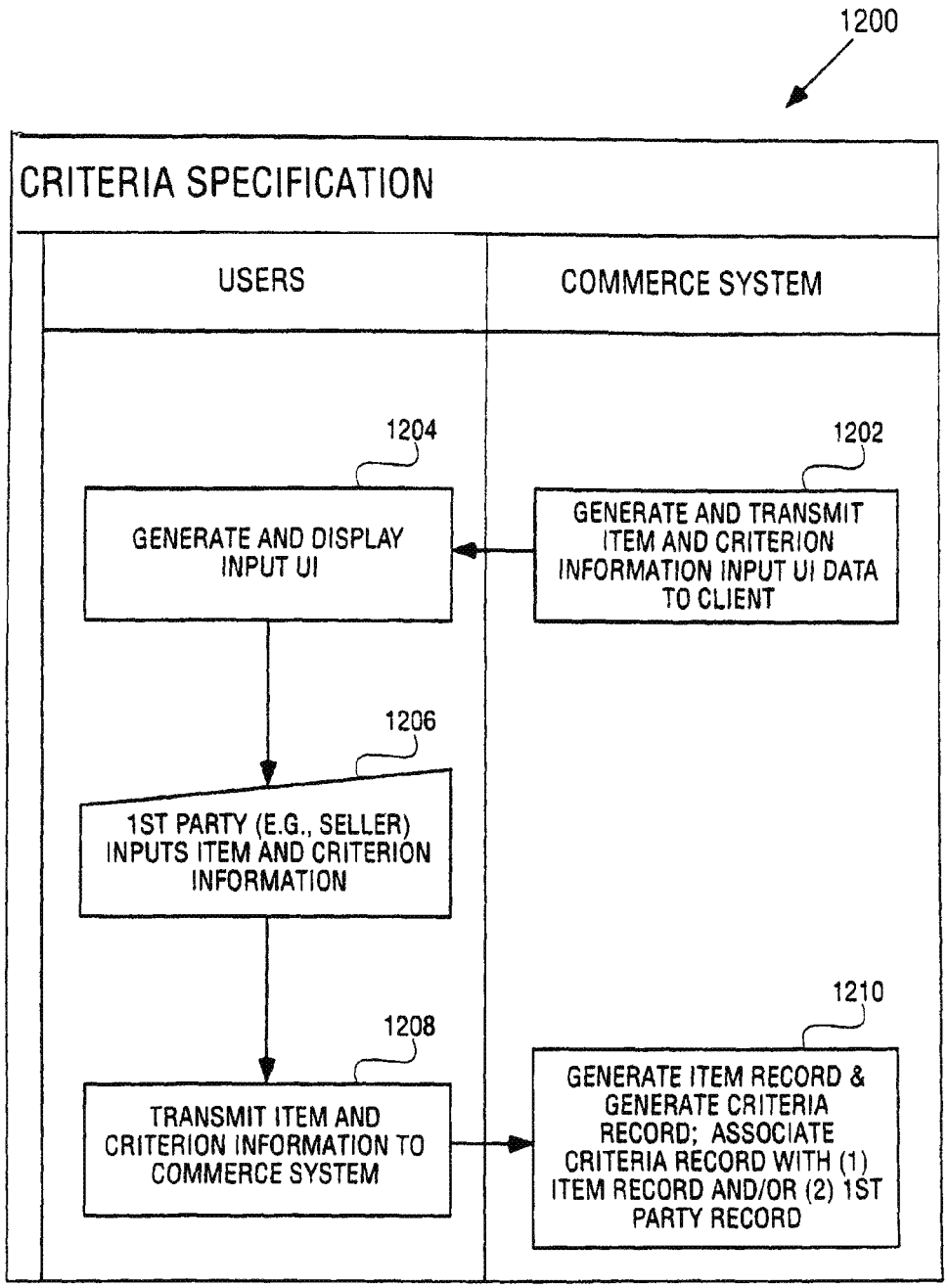
FIG. 12 is a flow chart illustrating a method, according to an exemplary embodiment of the present invention, whereby a first party (e.g., a seller user) may define and specify criteria to be satisfied by a second party (e.g., a buyer user) order for the second party to be automatically qualified to transact for a specific item, or for a number of items (e.g., all items offered for sale by the first party).

FIG. 12 is a flow chart illustrating a method 1200, according to an exemplary embodiment of the present invention, whereby a first party (e.g., a seller user of the commerce system 1100) may define and specify criteria to be satisfied by a second party (e.g., a buyer user of the commerce system 1100) in order for the second party automatically to be qualified to transact for a specific item, or for a number of items (e.g., all items offered for sale by the first party). It will accordingly be appreciated that the specified criteria may be associated with a specific item, or associated with a specific party (e.g., the first party).

The method 1200 commences at block 1202 at the commerce system 1100, with the generation and transmission to a first party of data specifying (or relating to) an item and criterion information input user interface. At block 1204, the item and criterion information input user interface is generated and displayed to the first party (e.g., a selling user) on a computing device of the first party.

Figure 13:
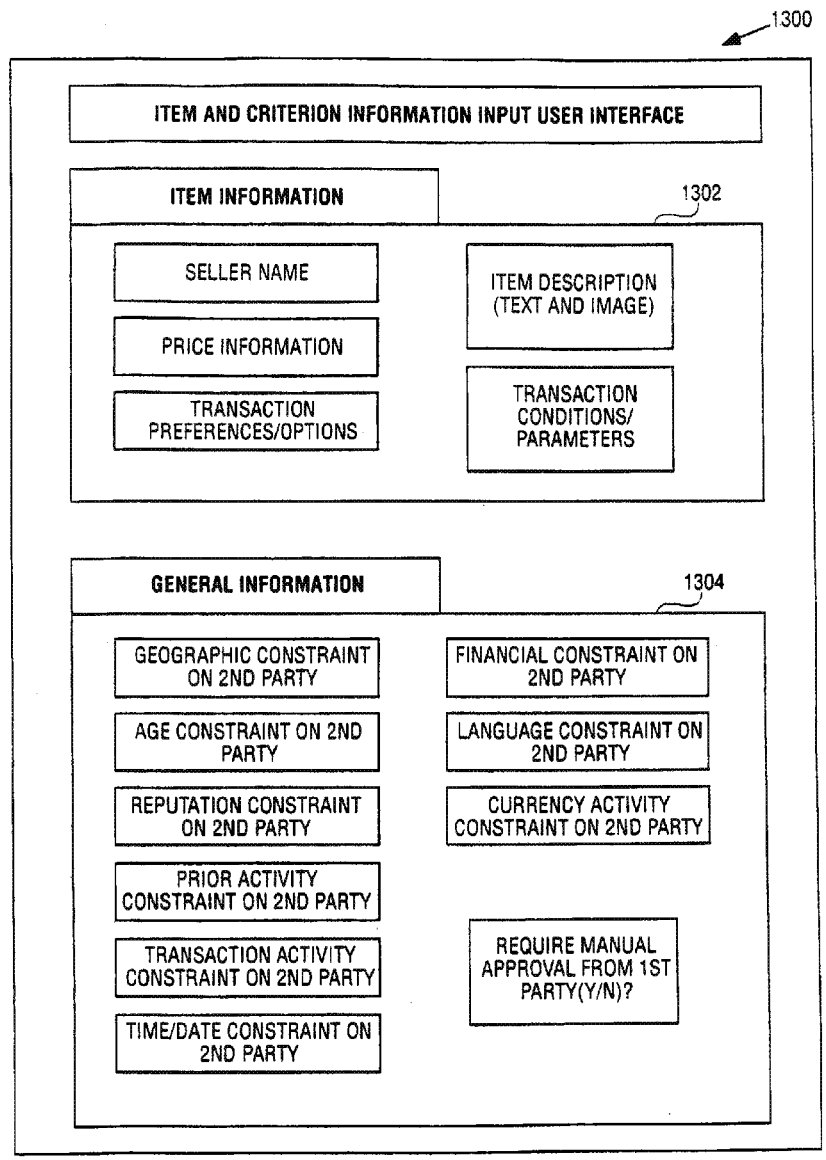
FIG. 13 is a diagrammatic representation of an item and criterion information input user interface, according to one exemplary embodiment of the present invention.

FIG. 13 is a diagrammatic representation of an item and criterion information input user interface 1300, according to one exemplary embodiment of the present invention. The input user interface 1300 is shown to include an item information portion 1302 and a criteria information portion 1304. The item information portion 1302 is shown to include a number of input fields into which the first user may input item information, such as name, price, transaction preference, item description and transaction condition (or parameter) information. Similarly, the criteria information portion 1304 includes a number of input fields into which the first party may optionally input criteria that must be satisfied by a second party in order to qualify the second party to transact with respect to the item described in the item information portion 1302, and according to the transaction preferences and transaction conditions described in the item information portion 1302. It will be appreciated that the criteria options that are presented in the criteria information portion 1304 may be dependent upon the type of transaction being facilitated by the commerce system 1100, the nature of the item to which the transaction pertains, user preferences and any number of variables. FIG. 13 provides a non-exhaustive list of exemplary criteria options that may be presented to the first party. A geographic criterion (or constraint) to be satisfied by a qualified second party may specify a geographic location (e.g., continent, country, state, city, town, zip code) in which a second party must decide to qualify to transact. A geographic constraint may also be expressed as a distance from a predetermined location (e.g., a maximum distance from the hometown of the first party). An age criteria (or constraint) may restrict a qualified second party to exceeding a predetermined minimum age threshold, to being below a predetermined maximum age threshold, or to be within a particular age range (e.g., 20-34 years old).

A reputation criterion (or constraint) may require that a qualified second party have a minimum predetermined reputation within the commerce system 1100. For example, the commerce system 1100 may implement a reputation system whereby the reputation of a particular user is expressed according to a particular scale or as a score. Any number of factors may contribute towards the establishment and definition of a reputation of a user, such as feedback from parties with whom the relevant user has interacted utilizing the commerce system 1100 (e.g., a number of negative of positive feedback comments), a history of transaction activity by the relevant user with respect to the commerce system 1100, and a history of violations of rules established by the commerce system 1100. A reputation measure may also be established by other factors, such as the amount of time that a particular user has been an active or registered user of the commerce system 1100, the age of the user, a financial standing of the user, etc.

A prior activity criterion (or constraint) may require that a qualified second party not have undertaken, or engaged in (or alternatively have positively undertaken or engaged in) a specified prior transaction activity. For example, the prior activity criterion may dictate that a qualified second party not have previously retracted a bid within an auction transaction process facilitated by the commerce system 1100, or that the qualified second party not have retracted more than a predetermined maximum threshold number of bids within one or more auction transaction processes, optionally within a predetermined time. On the other hand, the prior activity criterion may require that a qualified second party have made a payment to a further party with which the second party transacted within a predetermined time period, or have delivered a purchased item within a predetermined time period or in a predetermined condition, in order for the second party to be qualified.

A time/date criterion (or constraint) may limit the time/date during which a second party is qualified to transact with respect to an item, or may act as a supplement criterion to the define a further criterion. For example, in the time/date criterion may be utilized to identify a time interval within which the prior activity specified by the prior activity criterion must have occurred in order to qualify or disqualified the second party (e.g., may specify a time interval within which a predetermined number of bid retractions must have occurred in order to disqualify the second party).

A financial criterion (or constraint) may require that a qualified second party, for example, have a credit rating above a predetermined minimum value, or not have previously been declared bankrupt. A financial criterion may also require that a qualified second party have a history of making payment within a predetermined maximum time period, or have a predetermined amount of funds (or credit resource) within an account with the commerce system 1100, or with a financial institution associated with or accessible by the commerce system 1100. The financial criterion may also require that to the second party have a credit card on record with the commerce system 1100, or agreed to use a particular payment service (e.g., Billpoint or PayPal).

A language criterion (or constraint) may require that a qualified second party indicate a predetermined language preference, or have previously transacted via the commerce system 1100 in a particular language, in order to qualify. Similarly, a currency activity criterion (or constraint) may require that a qualified second party have previously transacted in a predetermined currency. Finally, the exemplary criterion information may also allow the first party to implement a manual override for a fully automatic approval process, whereby manual approval by the first party of a second party is required in order to finally qualify the second party to transact, even if the second party succeeds in satisfying the criterion associated with a particular item.

The input user interface 1300 may optionally also allow the first party to specify relationships between one or more criterion so as to facilitate the formulation of a "qualification formula" or complex qualification policy that is expressed in terms of multiple criterion. For example, the input user interface 1300 may facilitate specification of an AND or OR operation between two or more criterion. In this matter, the first party may, for example, specify qualification formula that requires that a qualified second party reside within a predetermined geographic area and not have received more than a predetermined number of negative feedback comments.

Returning now to the method 1200 illustrated in FIG. 12, having generated and displayed the input user interface at block 1204, at block 1206 the first party (e.g., a selling user) inputs items and criterion information into the item and criterion information input user interface. At block 1208, the inputted item and criterion information is transmitted from the first party to the commerce system 1100.

At block 1210, the commerce system 1100 generates an item record that is written into an items table within the database 1112 and a criteria record that is written into a criteria table, also maintained within the database 1112. Specifically, upon receipt of the transmitted item and criterion information at a web server 1104, the parser 1122 extracts the item and criterion information, which is then communicated to the database engine server 1106. The database engine server 1106 proceeds to build the appropriate records and write them into the appropriate tables within the database 1112.

Figure 14:
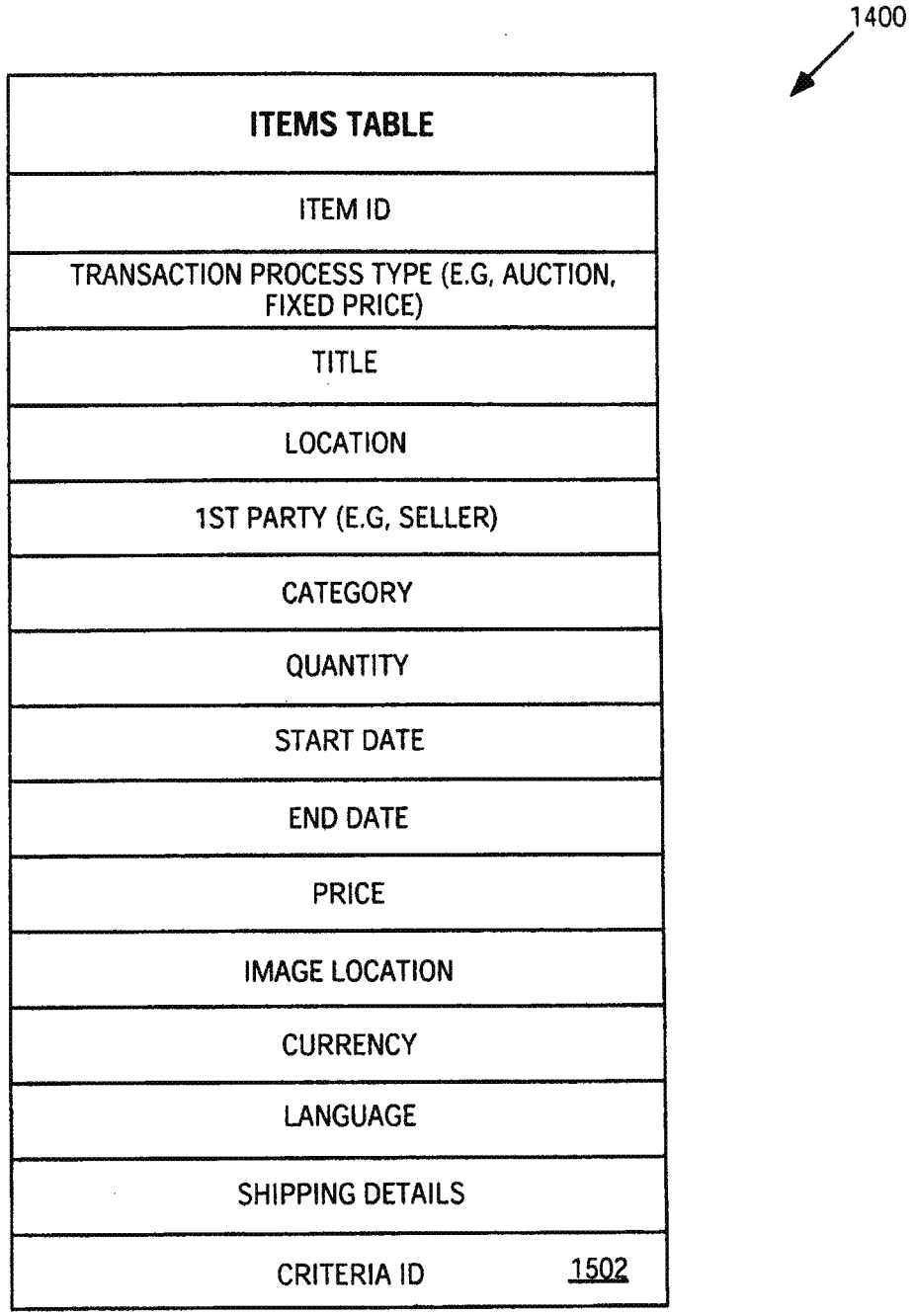
FIG. 14 is a diagrammatic representation of an exemplary items table.

FIG. 14 is a diagrammatic representation of an exemplary items table 1400, and indicates the various fields that may be populated for each record within this table 1400.

Figure 15:
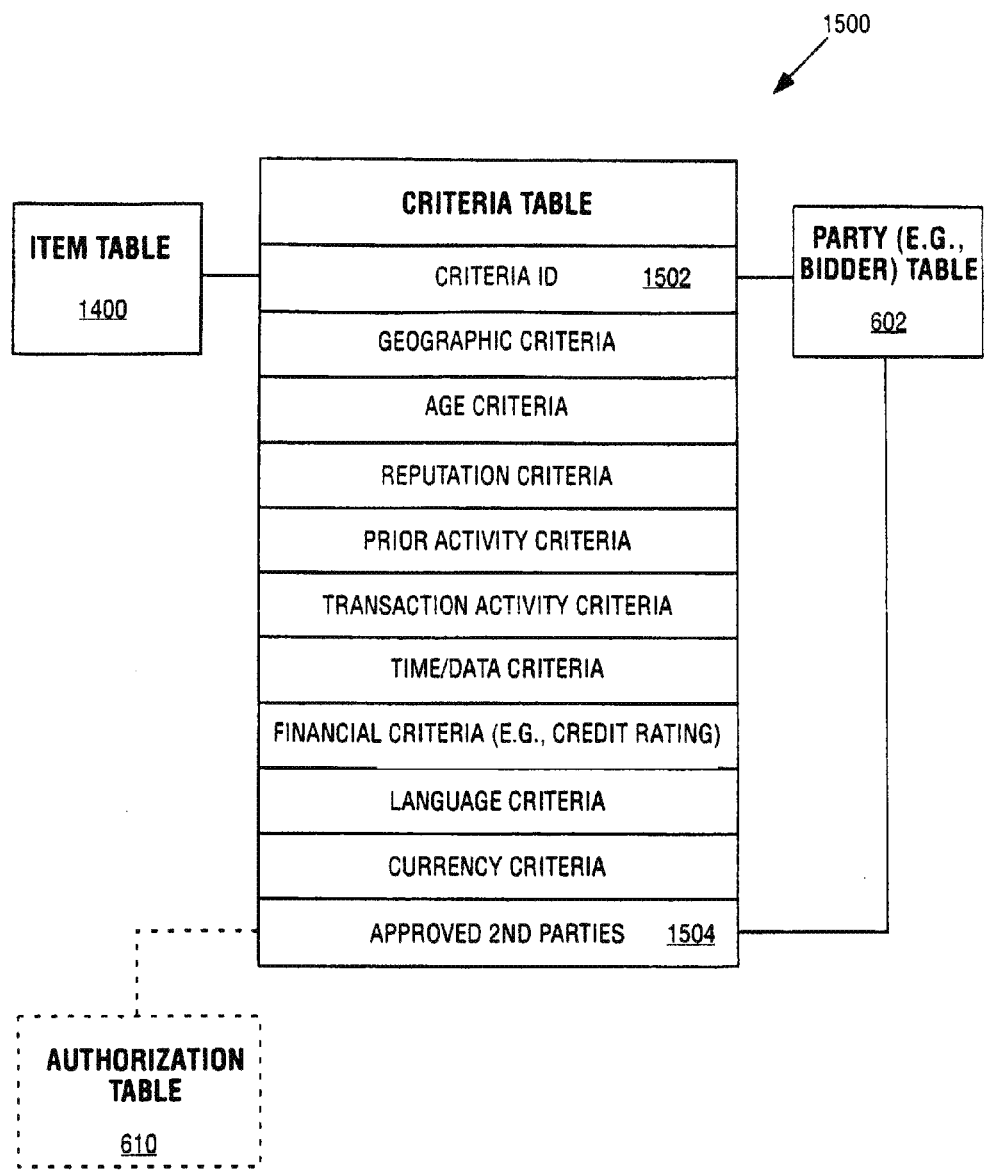
FIG. 15 is a diagrammatic representation of an exemplary criteria table.

FIG. 15 is a diagrammatic representation of an exemplary criteria table 1500. Each record within the criteria table 1500 is shown to include a criteria identifier 1502 that may operate as a primary key for the table 1500, and be utilized to associate a particular criterion record with one or more item records within the items table 1400 or with one or more party (e.g., user records of within a party table 602. A record within the criteria table 1500 may also include an Approved Second Party entry 1504 that identifies the parties (e.g., users) for which records exist within the party table 602 and that have been manually approved to transact by the first party. In an alternative embodiment, as discussed above, a Preapproved Parties table may be maintained separate of the criteria table 1500. An entry within the Approved Second Party field 1504 of a particular record within the criteria table 1500 may also be linked to a record within an authorized party table 610.

Having received item information relating to and describing an item, and criterion information specifying at least one criterion to be satisfied by a second party in order for the second party to be qualified to transact for an item, according to one embodiment of the present invention, a criteria enforcement process is implemented by the commerce system 1100. In one embodiment, the criteria enforcement process involves automatically determining whether a second party satisfies at least one criterion specified by the criterion information and, if so, then automatically qualifying the second party to transact for an item, or group of items, via the commerce system 110. As described above, through the item and criterion information input user interface 1300, the commerce system 1100 allows a first party to specify one or more criterion to be satisfied by a second party to qualify to transact. As also described above, the first user, when specifying multiple criteria, can define a qualification formula or function utilizing the multiple criteria. For example, the first party has the option of specifying AND and OR relationships between individual criterion so as to construct a customized qualification formula (or function).

In one embodiment, the criteria enforcement process is performed by the qualification module 1108 of the application server 1102. The qualification module 1108 makes an assessment as to whether a second party satisfies one or more criterion specified by a first party utilizing input received from the second party via a user interface and communicated to the web server 1104, or utilizing data regarding the second party extracted from the database 1112 by the database engine server 1106.

Figure 16:
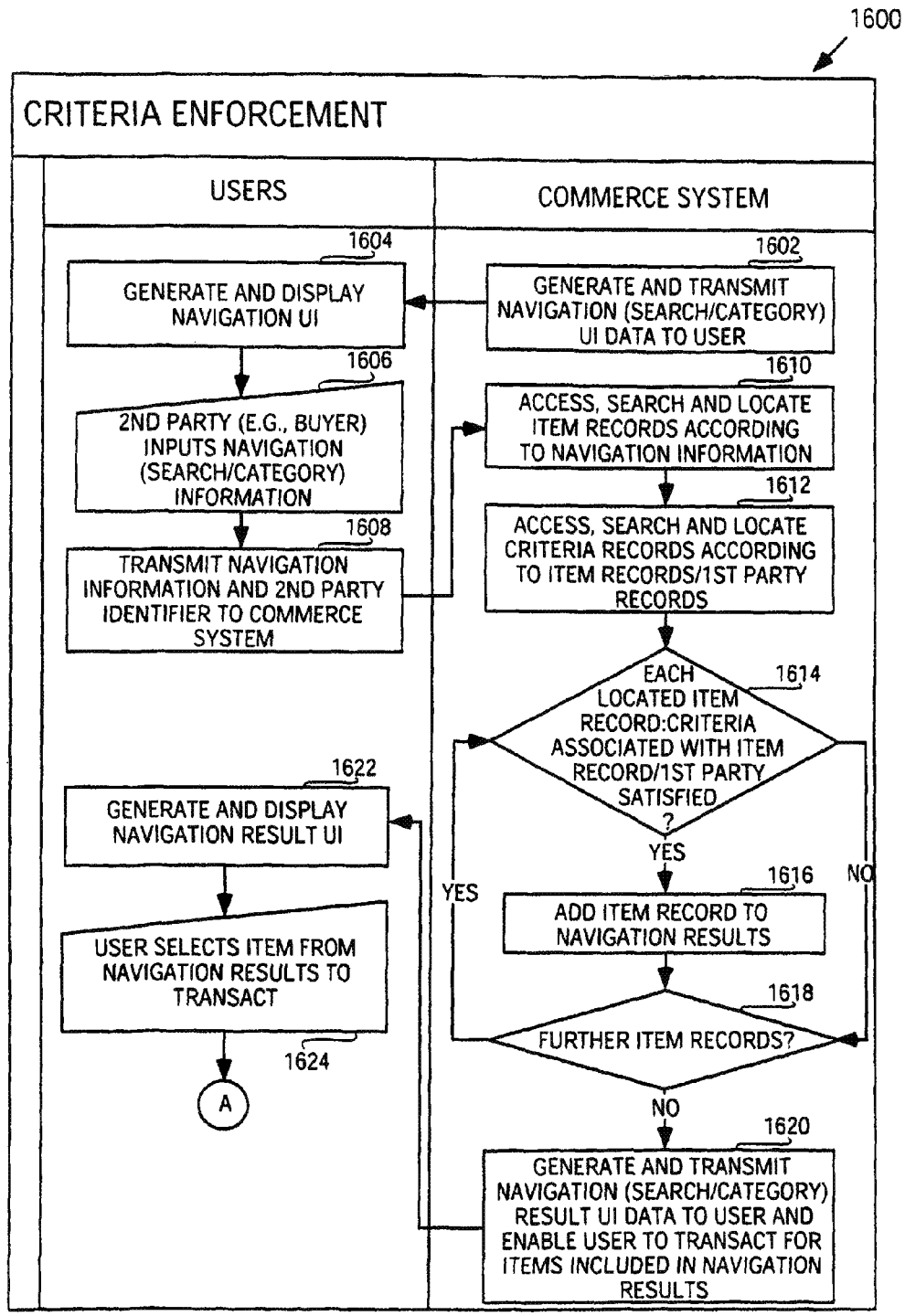
FIG. 16 is a flow chart illustrating a first exemplary method whereby a commerce system may automatically qualify a second party to transact, or disqualify a second party from transacting, with respect to a particular item, or group of items.

FIG. 16 is a flow chart illustrating a first exemplary method 1600 whereby a commerce system 1100 may automatically qualify a second party to transact, or disqualify a second party from transacting, with respect to a particular item, or group of items.

The method 1600 commences at block 1602 with the generation and transmission of navigation user interface data from the commerce system 1100 to a second user (e.g., to a personal computer or mobile device operated by the second user). Specifically, the page build module 1120 of the web server 1104 may, in one embodiment, construct a markup language document that instructs the generation of a suitable navigation user interface to the second party. The navigation user interface may facilitate navigation of a large number of items offered for transacting by the commerce system 1100 according to any one or more of a number of transaction processes. For example, the navigation user interface may allow the second party to perform key word searches of item descriptions contained in the items table 1400. The navigation user interface may also allow the second party to locate items of interest by browsing established categories supported by the commerce system 1100. For example, with reference to FIG. 14, it will be noted that the items table 1400 includes a category field whereby a particular item may be conveniently categorized according to a category scheme supported by the commerce system 1100.

At block 1604, a navigation user interface is generated and displayed to the second party. For example, where the navigation user interface data comprises a markup language document, a browser operating on a personal computer of the second user may utilize the user interface data to generate and display the navigation user interface.

At block 1606, the second party (e.g., a buyer user), inputs navigation information into the navigation user interface with the purpose of locating one or more item records that are of interest. As mentioned above, the second party may, for example, provide search key words, or specify a certain item category, with a view to locating item records of interest.

At block 1608, the navigation information inputted into the navigation user interface, as well as an identifier identifying the second party, is transmitted to the commerce system 1100. For example, the identifier identifying the second party may be a session ID established during an online session between the second party and the commerce system 1100, or an identifier extracted from a cookie stored on a computing device operated by the second party. Further, the identifier for the second party may be a user ID entered by the second party into the navigation user interface (or a preceding logon interface)

At block 1610, the navigation information is received by the commerce system 1100, and specifically by the parser 1122 of the web server 1104 that operates to extract the navigation information from a network transmission. The parser 1122 then communicates the navigation information (e.g., a search term or a category identifier) to an appropriate item records query 1114 that locates item records within the items table 1400 according to the navigation information. The located item records are then communicated from the item records query 1114 to the qualification module 1108.

At block 1612, in one embodiment, identifiers for the located item records are communicated from the item records query 1114 to a criteria query 116 that, at block 1612, accesses, searches and locates criteria records within the criteria table 1500 that are associated with the located items. As noted above with reference to FIG. 16, a criteria identifier 1502 may map to one or more records within the items table 1400.

A criteria record within the criteria table 1500 may also be associated with a particular party, for which a record exists within the party table 602. In this case, an appropriate criteria query 1116 may operate to identify a first party associated with a specific located item record (e.g., a seller), and then perform a query against the party table 602 to identify one or more criteria identifiers 1502 associated with the relevant first party. Having then located a criteria identifier associated with the first party, the criteria query 116 may then access the criteria table 1500 to locate and retrieve an appropriate criteria record. It will be appreciated that where multiple located item records exist, different criteria records may be associated with each of these item records, either directly or indirectly through a first party (e.g., a seller). Accordingly, a criteria record may in this way be associated with each of the located item records.

At decision box 1614, for each located item record, a determination is made as to whether a criterion, or multiple criteria, specified within a criteria record associated with the item record is satisfied. It will of course be appreciated that this determination is dependent upon the criterion specified by the appropriate criteria record, and optionally also by the nature of the criteria formula (or function) that may be expressed in terms of such multiple criterion.

Examples of criterion that may be specified are described above with reference to the input user interface 1300 illustrated in FIG. 13 and the criteria table 1500, illustrated in FIG. 15. In order to assess whether a single criterion, multiple criteria, or even a criteria formula is satisfied by the second party, it will be appreciated that information regarding the second party is required. In one exemplary embodiment, the determination made at decision block 1614 is made by the qualification module 1108 of the application server 1102, utilizing criteria records located by one or more criteria queries 1116, and profile data concerning the second party extracted by one or more profile queries 1118 from profile tables maintained within the database 1112. The identifier for the second party, transmitted to the commerce system 1100 at block 1608 is parsed by the parser 1122 of the web server 1104, and utilized at decision block 1614 to identify profile records within profile tables for the second party.

Figure 18:
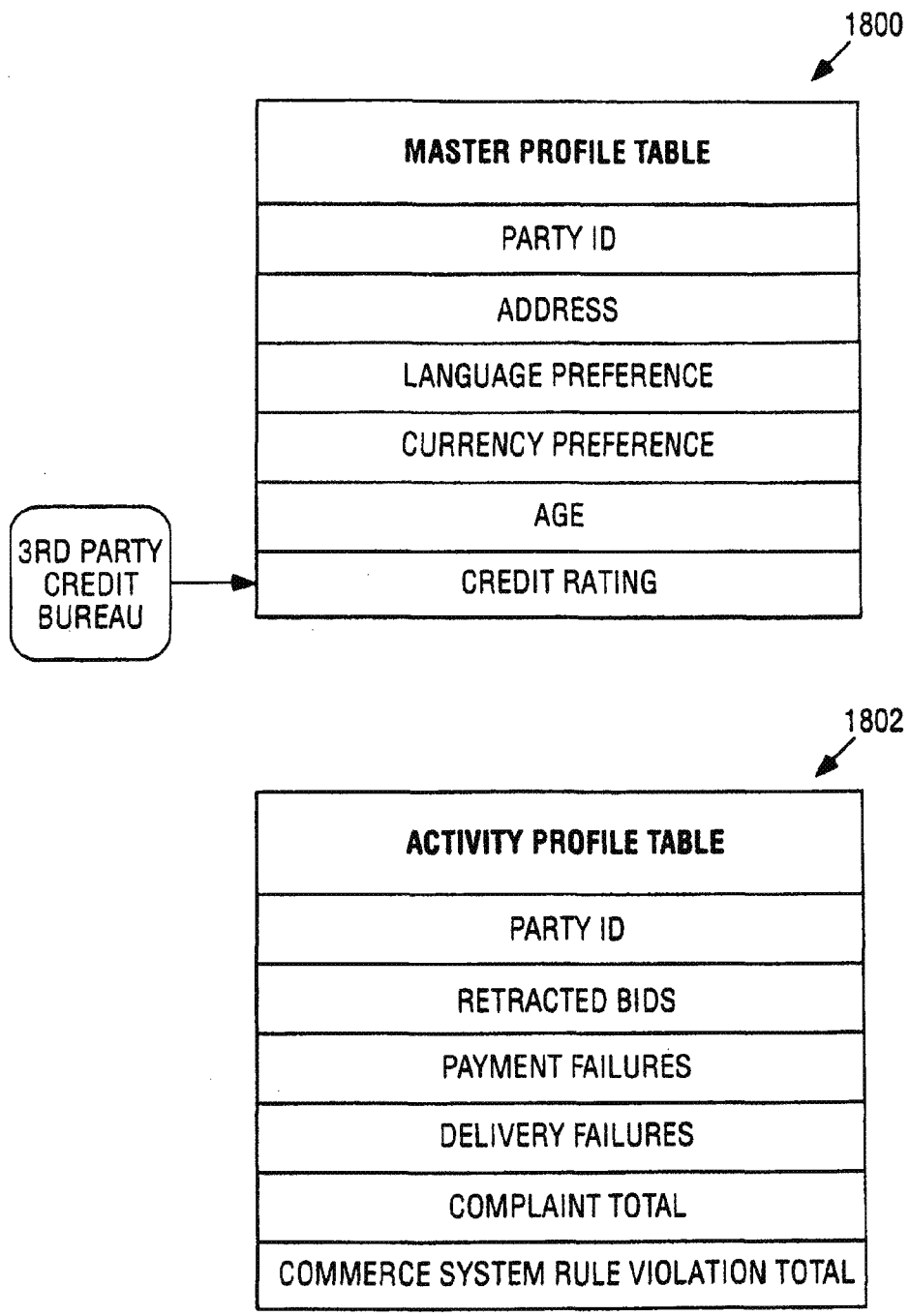
FIG. 18 provides diagrammatic representations of exemplary profile tables.

FIG. 18 provides diagrammatic representations of two such exemplary profile tables that may be maintained within the database 1112, namely master profile table 1800 and an activity profile table 1802. The exemplary master profile table 1800 is populated with records for each party that has registered to utilize the commerce system 1100. Each record contains personal information regarding the appropriate party that may be voluntary submitted by the relevant party, or gleaned from external sources. For example, a record within the master profile table 1800 may indicate the address, language preference, currency preference, age and credit rating of an appropriate party. The address, language preference, currency preference and age information may be gleaned from the relevant party as part of a registration process for utilization of the commerce system 1100. The credit rating information may, as illustrated, be obtained from a third party credit bureau.

The activity profile table 1802 may similarly contain a record fir each party that utilizes the commerce system 1100. However, this profile table 1802 may contain information reflecting behavioral and transactional characteristics of the relevant party, as observed or tracked by the commerce system 1100 over a period of time. Both positive and negative characteristics or activities of a particular party may be recorded within the profile table 1802. For example, the exemplary activity profile table 1802 is show to maintain an indication of a number of bids retracted by a particular party within the context of auction process transactions. A record within the activity profile table 1802 may also indicate a number of payment failures associated with the relevant party, a number of delivery failures associated with the relevant party, a total of number of complaints received against, or issued by, the relevant party, and a total number of violations of rules of the commerce system 1100 attributable to the relevant party. It will of course be appreciated that a wide range of other activities and characteristics of a particular party may be tracked within one or more tables similar to the activity profile table 1802. Of course, the activities or characteristics tracked within a profile table 1802 may be such so as to support the various criteria options that may be presented to a first party within a criterion information portion 1304 of an item and criterion information input user interface 1300.

In the exemplary embodiment, the qualification module 1108, having collected one or more criteria records and the appropriate profile information regarding the second user, is able to make a determination as to whether the second party satisfies one or more criterion associated with a specific item record.

If the criteria expressed by a criteria record associated with a particular item record are determined to have been satisfied at decision block 1614, at block 1616, the relevant item record is added to a set of navigation results. The set of navigation results includes, in one embodiment, only those item records for which the second party is identified as being a qualified party. At decision block 1618, a determination is made as to whether there are further item records for which associated criteria must be assessed. If so, the method 1600 loops back to decision block 1614.

Similarly, if the criteria associated with a particular located item record are determined at decision block 1614 not to be satisfied, the method 1600 progresses directly from decision block 1614 to decision block 1618.

Once it has been determined at decision block 1618 that no further item records require consideration, the method 1600 progresses to block 1620. At block 1620, the commerce system 1100, and specifically the page build module 1120 of the web server 1104, generates and transmits navigation result user interface data to the user. The navigation result user interface data includes an identifier for each of the located item records that were included within the navigation results at block 1616. The page build module 1120 receives the navigation results from the qualification module 1108. In addition to communicating the navigation results to the page build module 1120, the qualification module 1108 also operates to enable the second party to transact for items identified in the navigation results. In one embodiment, this enablement is achieved by including an identifier for the second party within the Approved Second Party field 1504 of the appropriate criteria table 1500. In an alternative embodiment, the items table 1400 may include an Approved Second Party field (not shown) in which an indication of second parties that have been approved, manually or automatically, is stored.

At block 1628, an application executing on a computing device (e.g., a browser executing on a personal computer) generates and displays a navigation result user interface, identifying the navigation results.

At block 1624, the second party selects an item from the navigation results to transact. From block 1624, a transaction process, facilitated in one embodiment by a transaction module 1110 of the application server 1102, is commenced. Further details regarding an exemplary transaction process are described below with reference to FIG. 17.

In summary, it will be appreciated that the exemplary criterion enforcement process implemented by the method 1600 operates to enable a qualified second party to transact with respect to an item by only presenting details regarding the item to the second party once the second party has been qualified. In other words, the qualification process acts as a filter so that the second party is only presented with the details for items for which the second party has been automatically (or manually) pre-qualified. This exemplary embodiment has the advantage of not frustrating the second party by allowing the commencement of a transaction process with respect to an item for which the second party may not qualify to transact.

Figure 17:
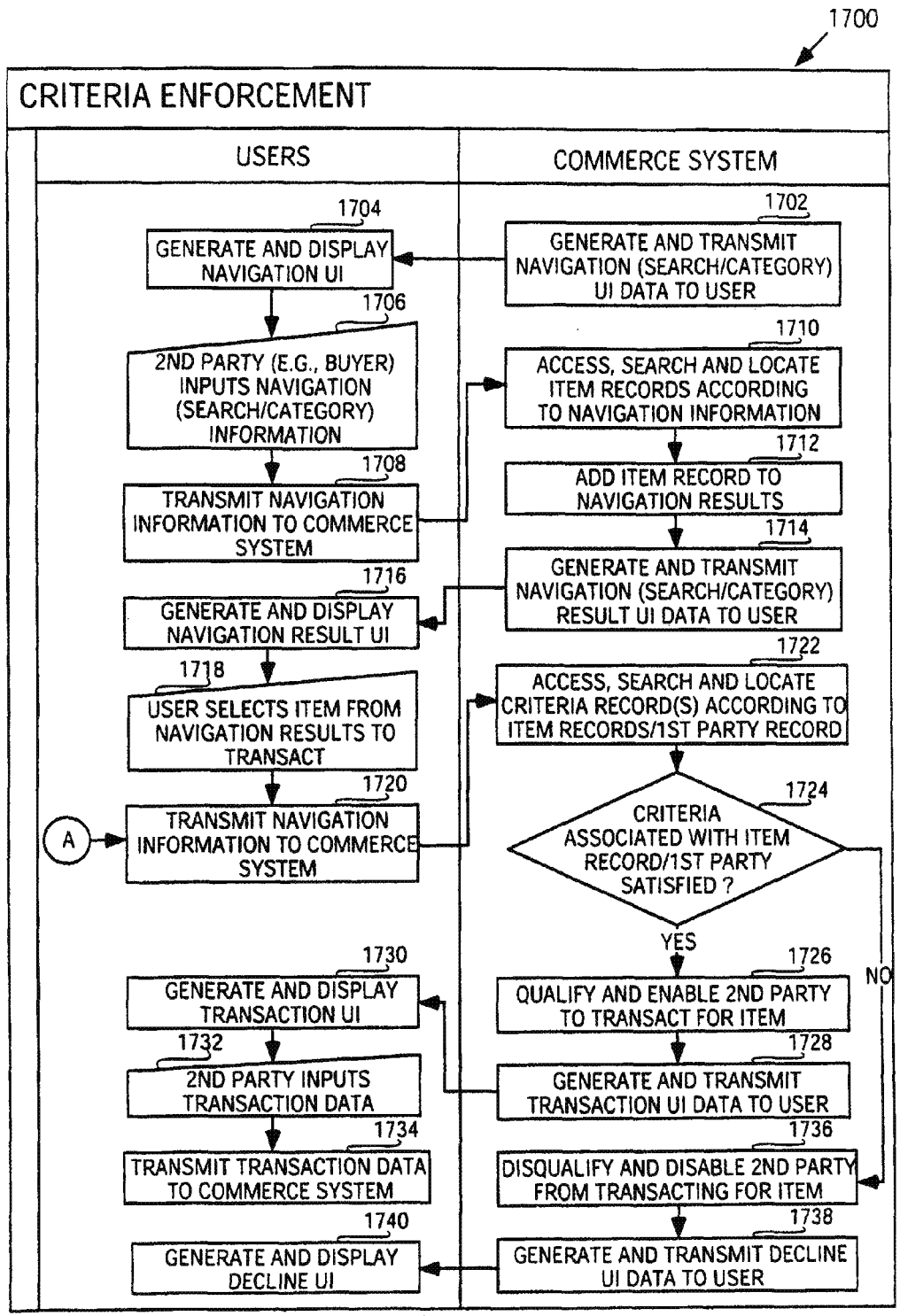
FIG. 17 is a flow chart illustrating a second exemplary method whereby a commerce system may automatically qualify a second party to transact, or disqualify a second party from transacting, with respect to a particular item, or group of items.

FIG. 17 is a flow chart illustrating a second exemplary enforcement process that may be implemented by a method 1700. Blocks 1702-1710 correspond substantially to the operations performed at blocks 1602-1610 described above with reference to FIG. 16. Moving on to block 1712, a set of navigation results is constructed to include all item records located at block 1710 utilizing the navigation information (e.g., a search term or a category identifier). The method 1700 thus differs from the method 1600 in that the navigation results include all record items located by a search and not only item records for which a particular second party qualifies.

At block 1714, the page build module 1120 of the web page server 1104 builds navigation results user interface data utilizing the navigation results as received directly from an item records query 1114 and transmits this navigation result user interface data to a computing device operated by a second party for display.

At block 1716, an appropriate application executing on a computing device operated by the second party (e.g., a browser being executed on a personal computer) operates to generate and display a navigation result user interface that includes identifiers for each item record included within the navigation results.

At block 1718, the second party selects one or more items from the navigation results for which the second party wishes to commence a transaction process utilizing the commerce system 1100. For example, the second party may select a Uniform Resource Locator (URL) associated with a particular item to perform the selection of the item.

At block 1720, information identifying the selected item is transmitted from the computing device operated by the second user to the commerce system 1100. For example, an HTTP PUT request may be dispatched from the computing device responsive to user selection of a URL associated with the selected item.

At block 1722, the parser 122 of the web server 1104 receives the data transmission initiated at block 1720, and parses the transmission to locate an identifier identifying the selected item. The parser 1122 then communicates the extracted identifier to an appropriate item record query 1114 of the database engine server that performs access, search and location operations with respect to the criteria table 1500 to identify a criteria record, specifying one or more criterion, associated with the selected item. It will of course be appreciated that this lookup operation may involve initially performing a lookup on an items table to obtain a relevant criteria ID with which to perform a lookup on the criteria table 1500.

Again, a criteria record may be associated directly with a items record, or may be associated indirectly with an item record through being associated directly with a party record for a party (e.g., the first party acting in the capacity of a seller) associated with an appropriate items record.

At decision block 1724, the qualification module 1108 of the application server 1102 operates to make a determination regarding whether a single criterion, or criteria, specified by the located criteria record is satisfied. As described above with reference to FIG. 16, this determination at block 1724 may, in one embodiment, involve the qualification module 1108 invoking one or more profile queries 1106 against profile tables stored within the database 1112 in order to retrieve profile information (e.g., from a master profile table 1800 and an activity profile table 1802) pertaining to the second party. The second party may be identified in any one of a number of ways (e.g., utilizing a session identifier initiated following a logon process, or utilizing identify information stored within a cookie on a computing device of the second party).

Following a positive determination by the qualification module 1108, at block 1726, the second party is qualified and enabled to transact for the relevant item. As described above, the enablement of the second user may involve storing appropriate identifier information within a relevant record within the criteria table 1500, the items table 1400 and/or the party table 602.

As a result of the qualification and enablement at block 1726, the transaction module 1110 is invoked to generate and communicate transaction information pertaining to the relevant item to the page build module 1120, which then generates and transmits transaction user interface data to a computing device of the second user.

At block 1730, an application executing on the client computing device (e.g., a browser executing on a personal computer) operates to generate and display a transaction user interface. The transaction module 1110 may operate to facilitate one or more transaction processes (e.g., a regular auction process and/or a fixed price process) via which the item may be transacted. Accordingly, the transaction user interface data, and the transaction user interface itself will reflect information concerning the one or more transaction processes supported by the transaction module 1110.

At block 1732, the second party then inputs appropriate transaction data. For example, within an auction process, the transaction data may include a bid specifying a price and other information specific to the auction type. In the case of a fixed price process, the transaction data may be acceptance of an offer to purchase an item at a fixed price, or an offer to purchase an item at a particular fixed price.

At block 1734, the transaction data is transmitted by the computing device of the second party to the commerce system 1100 for processing by the transaction module 1110 within the context of an appropriate transaction process.

Returning to decision block 1724, following a negative determination at block 1726, the second party is disqualified and disabled from transacting for the particular item, and a decline user interface data is generated and transmitted to the second party at block 1738. At block 1740 an application executing on a client machine operated by the second party generates and displays a decline user interface, advising the second party that the second party has been disqualified from transacting for the item. In this case, the decline user interface may optionally provide one or more reasons to the second party for the disqualification by the qualification module 1108. For example, the second party may be advised that he or she has been disqualified as a result of an excessive number of retracted bids within a predetermined time period (e.g., one month) preceding a current date.

In summary, the exemplary criteria enforcement process implemented by the method 1700 is advantageous in that the qualification assessment, performed at block 1724, is only performed for a selected item in which a second party indicates express interest. This is different from the exemplary criteria enforcement process of method 1600 where the qualification process is performed with respect to each and every item located by a search. Accordingly, the criterion enforcement process of method 1700 is advantageous in that it may be computationally less demanding of the commerce system 1100.

It will be appreciated that the exemplary enforcement criteria enforcement processes described above as being implemented by methods 1600 and 1700 are merely two examples of multiple ways in which a criteria enforcement policy may be implemented. For example, a qualification assessment may be made at any stage during a particular navigation or transaction process. Furthermore, a criterion expressed within a criteria record may be of such a nature that a determination as to whether the criterion is satisfied may only be made once the transaction process has progressed to a certain stage. For example, the criterion may comprise a transaction criterion that relates to transaction activity pertaining to the transaction of the specific item. In this case, the transaction criterion may specify that a second party becomes disqualified from transacting for the item when the second party submits a bid price offer that is in excess of a threshold value that clearly exceeds any reasonable offer price for the relevant item. Such an excessive bid offer price may be indicative of the fact that the bid offer lacks sincerity, and is in fact a hoax. Further, the transaction criteria may operate to automatically disqualify the second party from transacting further with respect to a particular item when the second party performs a particular transaction activity. For example, were the second party to retract a bid for a particular item, this transaction activity may disqualify the second party from attempting to again transact for the specific item (e.g., submit a further bid) for the relevant item.

While the above exemplary embodiment have been described as pertaining to a transaction for an item, the above exemplary embodiments of the present invention have been described with reference to transactions pertaining to an item. It will be understood that an item covers both a product (or goods) and a service (or services).

Figure 19:
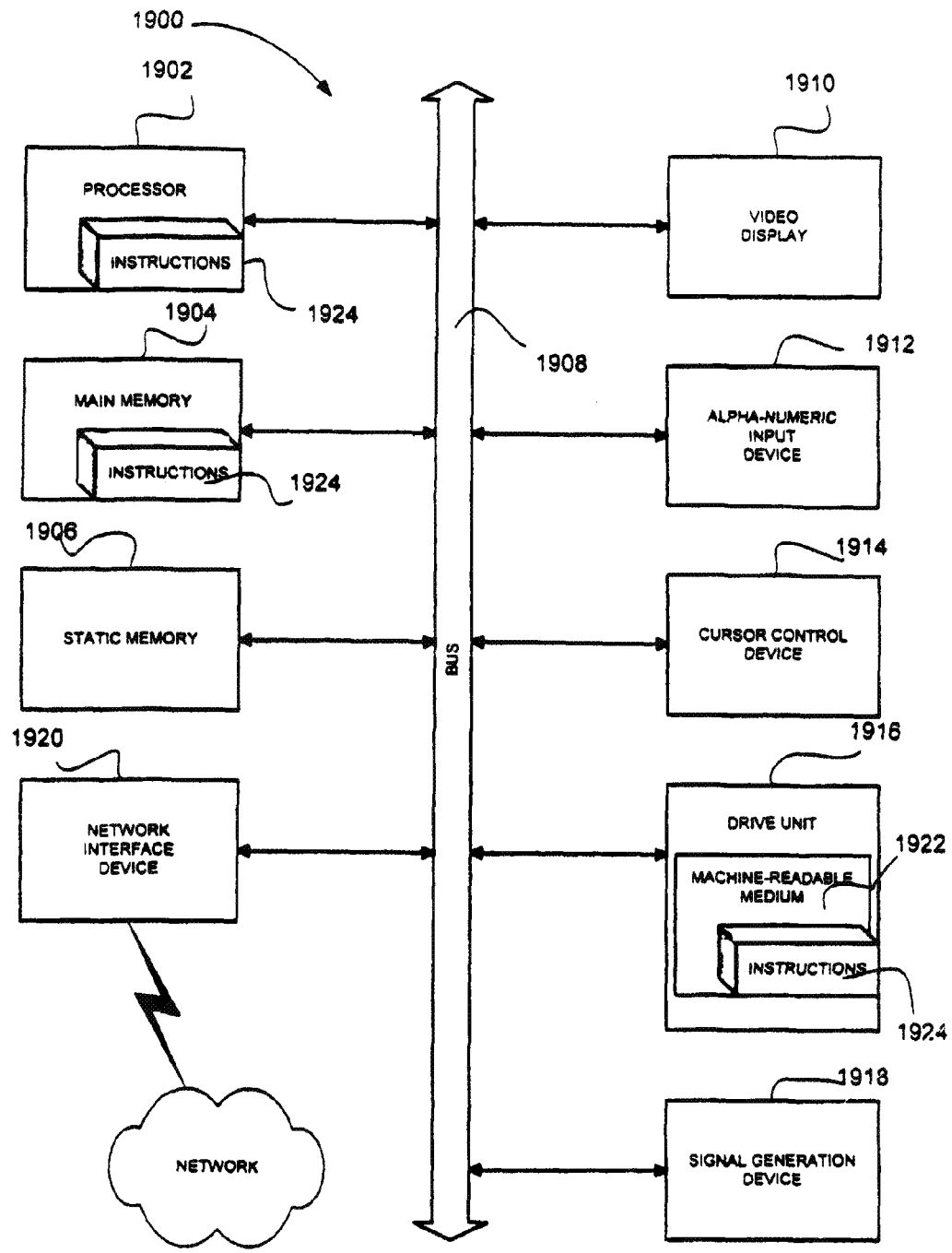
FIG. 19 shows a diagrammatic representation of machine in the exemplary form of a computer system within which a set of instructions, for causing the machine to perform any one of the methodologies discussed above, may be executed.

FIG. 19 shows a diagrammatic representation of machine in the exemplary form of a computer system 1900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine. Within the context of the above exemplary embodiments, the machine may a server machine on which any of the described servers may be hosted. The machine may also comprise a computing device utilized by a party to access and interact with the commerce system 1100.

The computer system 1900 includes a processor 1902, a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a cursor control device 1914 (e.g., a mouse), a disk drive unit 1916, a signal generation device 1918 (e.g., a speaker) and a network interface device 1920.

The disk drive unit 1916 includes a machine-readable medium 1922 on which is stored a set of instructions (i.e., software) 1924 embodying any one, or all, of the methodologies described above. The software 1924 is also shown to reside, completely or at least partially, within the main memory 1904 and/or within the processor 1902. The software 1924 may further be transmitted or received via the network interface device 1920. For the purposes of this specification, the terra "machine-readable medium" shall be taken to include any medium that is capable of storing, carrying or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system to implement seller authorized bidding within a network-based auction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   one or more processors and executable instructions accessible on a computer-readable medium that, when executed, cause the one or more processors to perform operations, the one or more processors are configured to at least:
   receive information, over a network, from a first party, information relating to an item to be transacted via a network-based commerce system;
   receive navigation information, over a network, from a second party;
   build a user interface based on the navigation information, the user interface comprising a rendering of at least one item being offered for sale on the network-based commerce system, the at least one item comprising an item identifier that identifies the item, the item identifier comprising a uniform resource locater (URL) that identifies the item on the network-based commerce system;
   transmit the user interface, over a network, to a computing device that is associated with the second party, the user interface being enabled to communicate a hypertext transfer protocol (HTTP) put request that identifies the item responsive to receiving a selection that identifies the item;
   receive the HTTP put request, from the computing device, the HTTP put request comprising the item identifier that identifies the item and a request to qualify the second party to transact the item via the network-based commerce system;
   associate the item identifier with information relating to the second party;
   transmit, over a network to the first party, a communication comprising the information relating to the second party;
   receive, over a network from the first party, a response corresponding to the communication; and
   responsive to receipt of the response, automatically perform an authorization process.

2. The system of claim 1, wherein the response comprises one of an affirmation of qualification of the second party and a denial of qualification of the second party, and wherein the authorization process composes one of authorizing the second party to transact in the transaction process responsive to identifying the response affirms a qualification of the second party and denying authorization of the second party to transact in the transaction process responsive to identifying the response denies a qualification of the second party.

3. The system of claim 1, wherein the information relating to the second party further comprises at least one of a credit score, bankruptcy filing information, a record of timeliness in payment history, a credit card brand name, a payment service brand name, and further information relating to the second party regarding the second party being obtained from a third party.

4. The system of claim 1, wherein the communication further comprises a number of bid retractions initiated by the second party in the network-based commerce system and the response comprises a denial of qualification of the second party to transact in the transaction process responsive to identifying that the number of bid retractions exceeds a predetermined threshold.

5. The system of claim 1, wherein the response comprises an affirmation of qualification for the second party to transact in the transaction process via the computer-based commerce system during a predetermined period of time.

6. The system of claim 1, wherein the response comprises an affirmation of qualification for the second party to transact via the computer-based commerce system while at least one criterion is met by the second party during the transaction process for the item.

7. The system of claim 1, wherein the communication further comprises a history of a number of rule violations of the computer-based commerce system that were issued against the second party, and wherein the response comprises a denial of qualification of the second party to transact in the transaction process responsive to identifying that the number of rule violations exceeds a predetermined amount.

8. The system of claim 1, wherein the communication further comprises an amount of time that the second party has been registered with the network-based commerce system, and wherein the response comprises an affirmation of qualification for the second party to transact in the transaction process responsive to identifying that the amount of time the second party has been registered exceeds a predetermined amount.

9. The system of claim 1, wherein the communication further comprises a relationship among a plurality of criteria, expressed with Boolean operators, and relating each of the plurality of criteria so as to define a criterion function.

10. A method comprising:
    receiving information, over a network, from a first party, information relating to an item to be transacted via a network-based commerce system;
    receiving navigation information, over a network, from a second party;
    building a user interface based on the navigation information, the user interface comprising a rendering of at least one item being offered for sale on the network-based commerce system, the at least one item comprising the item comprising an item identifier that identifies the item, the item identifier comprising a uniform resource locater (URL) that identifies the item on the network-based commerce system;

transmitting the user interface, over a network, to a computing device that is associated with the second party, the user interface being enabled to communicate a hypertext transfer protocol (HTTP) put request that identifies the item responsive to receiving a selection that identifies the item;

receiving the HTTP put request, from the computing device, the HTTP put request comprising the item identifier that identifies the item and a request to qualify the second party to transact the item via the network-based commerce system;

associating the item identifier with information relating to the second party;

transmitting, over a network to the first party, a communication comprising the information relating to the second party;

receiving, over a network from the first party, a response corresponding to the communication; and responsive to receiving the response, automatically performing an authorization process.

11. The method of claim 10, wherein the response comprises one of an affirmation of qualification of the second party and a denial of qualification of the second party, and wherein the authorization process comprises one of authorizing the second party to transact in the transaction process responsive to identifying the response affirms a qualification of the second party and denying authorization of the second party to transact in the transaction process responsive to identifying the response denies a qualification of the second party.

12. The method of claim 10, wherein the information relating to the second party further comprises at least one of a credit score, bankruptcy filing information, a record of timeliness in payment history, a credit card brand name, a payment service brand name, and further information relating to the second party regarding the second party being obtained from a third party.

13. The method of claim 10, wherein the communication further comprises a number of bid retractions initiated by the second party in the network-based commerce system and the response comprises a denial of qualification of the second party to transact in the transaction process responsive to identifying the number of bid retractions exceeds a predetermined threshold.

14. The method of claim 10, wherein the response comprises an affirmation of qualification for the second party to transact in the transaction process via the computer-based commerce system during a predetermined period of time.

15. The method of claim 10, wherein the response comprises an affirmation of qualification for the second party to transact via the computer-based commerce system while at least one criterion is met by the second party during the transaction process for the item.

16. The method of claim 10, wherein the communication further comprises a history of a number of rule violations within the computer-based commerce system initiated by the second party, and wherein the response comprises a denial of qualification of the second party to transact in the transaction process responsive to identifying the number of rule violations exceeds a predetermined amount.

17. The method of claim 10, wherein the communication further comprises an amount of time that the second party has been registered with the network-based commerce system, and wherein the response comprises an affirmation of qualification for the second party to transact in the transaction process responsive to identifying the amount of time the second party has been registered exceeds a predetermined amount.

18. The method of claim 10, wherein the communication further comprises a relationship among a plurality of criteria, expressed with Boolean operators, and relating each of the plurality of criteria so as to define a criterion function.

19. A machine-readable hardware storage memory tangibly embodying a program of instructions which, when executed by the machine, cause the machine to perform operations comprising:

receiving information, over a network, from a first party, information relating to an item to be transacted via a network-based commerce system;

receiving navigation information, over a network, from a second party;

building a user interface based on the navigation information, the user interface including a rendering of at least one item being offered for sale on the network-based commerce system, the at least one item comprising the item comprising an item identifier that identifies the item, the item identifier comprising a uniform resource locater (URL) that identifies the item on the network-based commerce system;

transmitting the user interface, over a network, to a computing device that is associated with the second party the user interface being enabled to communicate a hypertext transfer protocol (HTTP) put request that identifies the item responsive to receiving a selection that identities the item;

receiving the HTTP put request, from the computing device, the HTTP put request comprising the item identifier that identifies the item and a request to qualify the second arty to transact the item via the network-based commerce system;

transmitting, over a network to the first party, a communication comprising the information relating to the second party;

receiving, over a network from the first party, a response corresponding to the communication; and responsive to receiving the response, automatically performing an authorization process.

* * * * *